(12) United States Patent
Bixby et al.

(10) Patent No.: US 12,465,354 B2
(45) Date of Patent: Nov. 11, 2025

(54) BREAKAWAY SUTURE FIXATION CONSTRUCT AND METHODS

(71) Applicant: RIVERPOINT MEDICAL, LLC, Portland, OR (US)

(72) Inventors: Elliot Bixby, Milwaukie, OR (US); Nathan Cook, Portland, OR (US)

(73) Assignee: Riverpoint Medical, LLC, Portland, OR (US)

(*) Notice: Subject to any disclaimer, the term of this patent is extended or adjusted under 35 U.S.C. 154(b) by 198 days.

(21) Appl. No.: 18/244,595

(22) Filed: Sep. 11, 2023

(65) Prior Publication Data
US 2024/0081812 A1 Mar. 14, 2024

Related U.S. Application Data

(60) Provisional application No. 63/423,590, filed on Nov. 8, 2022, provisional application No. 63/405,385, filed on Sep. 9, 2022.

(51) Int. Cl.
*A61B 17/04* (2006.01)
*A61B 17/06* (2006.01)

(52) U.S. Cl.
CPC ...... *A61B 17/0487* (2013.01); *A61B 17/0401* (2013.01); *A61B 17/06166* (2013.01)

(58) Field of Classification Search
CPC ........... A61B 17/0487; A61B 17/0401; A61B 17/06166; A61B 2017/0406; A61B 2017/00526; A61B 2017/06185; A61B 17/0469; A61B 17/0485
See application file for complete search history.

(56) References Cited

U.S. PATENT DOCUMENTS

| | | | |
|---|---|---|---|
| 8,834,521 B2 | 9/2014 | Pinto et al. | |
| 10,245,016 B2 | 4/2019 | Zajac et al. | |
| 10,258,320 B2 | 4/2019 | Dreyfuss et al. | |
| 10,595,845 B2 | 3/2020 | Burkhart et al. | |
| 10,898,179 B2 | 1/2021 | Dreyfuss et al. | |
| 2011/0270278 A1* | 11/2011 | Overes | A61B 17/0487 606/228 |
| 2013/0138150 A1 | 5/2013 | Baker et al. | |
| 2015/0238183 A1* | 8/2015 | Sengun | A61B 17/0401 606/232 |
| 2023/0139434 A1* | 5/2023 | Dooney, Jr. | A61B 17/0401 606/232 |

* cited by examiner

*Primary Examiner* — Katherine Shi
(74) *Attorney, Agent, or Firm* — BrainSpark Associates, LLC

(57) ABSTRACT

The embodiments disclosed herein are breakaway suture constructs containing releasable locking connections and/or methods of assembly that allow a plurality of sutures, and/or suture ends to be attached or connected together along a portion of their length to form a spliced region that unifies the sutures or suture ends and prevent movement of a suture end relative to other suture end. The releasable connections allow the surgeon to easily manipulate the spliced suture ends with little or no force to result in the unified ends of the sutures to be separated without requiring cutting or severing of the individual sutures or the releasable locking connections.

17 Claims, 19 Drawing Sheets

BREAKAWAY SUTURE FIXATION CONSTRUCT AND METHODS

CROSS-REFERENCE TO RELATED APPLICATIONS

This application claims the benefit of U.S. Provisional Application No. 63/405,385 entitled "Breakaway Suture Loop," filed Sep. 9, 2022, and U.S. Provisional Appl. No. 63/423,590 entitled "Breakaway Suture Loop," filed Nov. 8, 2022, the disclosures of which are incorporated by reference herein in their entireties.

TECHNICAL FIELD

The invention relates to methods, devices, and systems for sutures and suture ends to be attached or connected together to allow for simplified usage and passage through openings in surgical tools and/or tissues, yet allows the suture or suture tails to be easily separated for individual usage at a desired point during a surgical procedure.

BACKGROUND OF THE INVENTION

It is often desirous to use multiple sutures or suture loop "tails" in a given surgical procedure, with the suture or suture loop tails loaded into a single surgical tool and passed through a single opening in a targeted tissue. In such a case, the sutures or suture loop tails may desirably be attached or connected together along some of their length, which often simplifies the loading and/or implantation procedures as well as the suture's passage through targeted tissues. However, at some point in the surgical procedure it is typically desirable to separate the sutures or suture tails of a suture or suture loop, and possibly utilize the individual sutures or suture tails for different activities, such as attaching to different anchoring points/devices and/or securing different portions of a patient's anatomy, etc. A need therefore exists for attaching sutures and/or suture loop tails together in an easily releasable fashion.

SUMMARY OF THE INVENTION

The following presents a simplified summary of the subject matter to provide a basic understanding of some aspects of the subject matter. This summary is not an extensive overview of the subject matter. It is intended to neither identify key or critical elements of the subject matter nor delineate the scope of the subject matter. Its sole purpose is to present some concepts of the subject matter in a simplified form as a prelude to the more detailed description that is presented later.

Disclosed are releasable suture connections and/or methods of assembly that allow a plurality of sutures, suture ends, and/or spliced suture ends to be attached or connected together along a portion of their length to greatly simplify loading and/or implantation steps during the surgical repair procedure. However, the selectively releasable connections allow the surgeon to easily release the plurality of sutures, suture ends, and/or spliced suture ends with little or no force to result in the unified ends of the sutures to be separated, desirably without requiring cutting or severing of the individual sutures.

In one embodiment, a breakaway suture construct assembly comprises: a first suture, the first suture comprising a first tail end and a second tail end, the first free end of the first suture being threaded longitudinally through a portion of the second free end of the first suture to create a splice region and a flexible loop, the splice region comprising a first end and a second end; a locking mechanism, the locking mechanism comprises a second suture, the second suture comprising a first tail end and a second tail end, at least a portion of the second suture extending transversely through the splice region at a location between the first end and second end of the splice region, the first tail end coupled to the second tail end of the second suture to create at least one releasable locking point and a locking loop; and an anchoring element.

In another embodiment, a breakaway suture construct assembly comprises: a first suture, the first suture comprising a first tail end and a second tail end, the first free end of the first suture being threaded longitudinally through a portion of the second free end of the first suture to create a splice region and a flexible loop, the splice region comprising a first end and a second end; a locking mechanism, the locking mechanism comprising a tag, a first strand with a first strand free end and a second strand with a second strand free end, a first strand free end or a second strand free end extending transversely through the splice region at a first location between the first end and second end of the splice region to exit out at a second location, the tag contacting a portion of the outer surface of the splice region at the first location, the first strand free end is coupled to the second strand free end of the locking mechanism to create a locking loop and a releasable locking point; and an anchoring element.

In another embodiment, a breakaway suture construct assembly comprises: a first suture, the first suture comprising a longitudinal axis, a first tail end and a second tail end, the first tail end of the first suture being threaded longitudinally through a portion of the second tail end of the first suture to create a splice region and a flexible loop, the splice region comprising a first end and a second end; a locking mechanism, the locking mechanism comprises a second suture, the second suture comprising a first portion, a second portion, a first tail end and a second tail end, the first portion of the second suture piercing the second tail end of the first suture transverse to the longitudinal axis of the first suture to create a first releasable locking point at a first location, the second portion contacting an outer diameter of the splice region at a second location to create a second releasable locking point; and an anchoring element.

In another embodiment, a method to assemble the breakaway suture construct comprises the steps of: providing a first suture and a second suture, the first suture comprising a longitudinal axis, first end and a second end, and the second suture comprising a first end and a second end; extending a portion the second suture through a portion of the first end of the first suture transverse to the longitudinal axis at a first location to create a trailing loop; creating the first locked point at the first location by passing the first and second free ends of the second suture through the trailing loop of the second suture; forming a spliced region and a flexible suture loop by threading the second end of the first suture longitudinally through the first end of the first suture, the spliced region includes a spliced first end and a spliced second end, the flexible loop comprises a loop crux; and creating a second releasable locked point at a second location, the second releasable locked point prevents the first end of the first suture to move relative to the second end of the first suture.

DETAILED DESCRIPTION

Disclosed are several embodiments of a breakaway suture construct assemblies 10, 42, 72 that contain or include releasable locking connections and/or methods of assembly that allow a plurality of sutures, and/or suture ends to be attached or connected together along a portion of their length to form a spliced region that unifies the sutures or suture ends. This greatly simplifies loading and/or implantation steps during the surgical repair procedure. However, the selectively releasable connections allow the surgeon to easily release plurality of sutures, suture ends, and/or spliced suture ends with little or no force to result in the unified ends of the sutures to be separated, desirably without requiring cutting or severing of the individual sutures. Furthermore, the spliced suture region or suture tail region can be more easily inserted into tissue and retrieved with instruments than individual regular suture ends/tape ends. After the spliced region of the breakaway suture construct is passed through tissue, the splice region can be released (desirably without cutting or otherwise damaging the sutures or suture tails themselves) to have again two sutures or suture tails available for use by the surgeon.

Figure 1A:
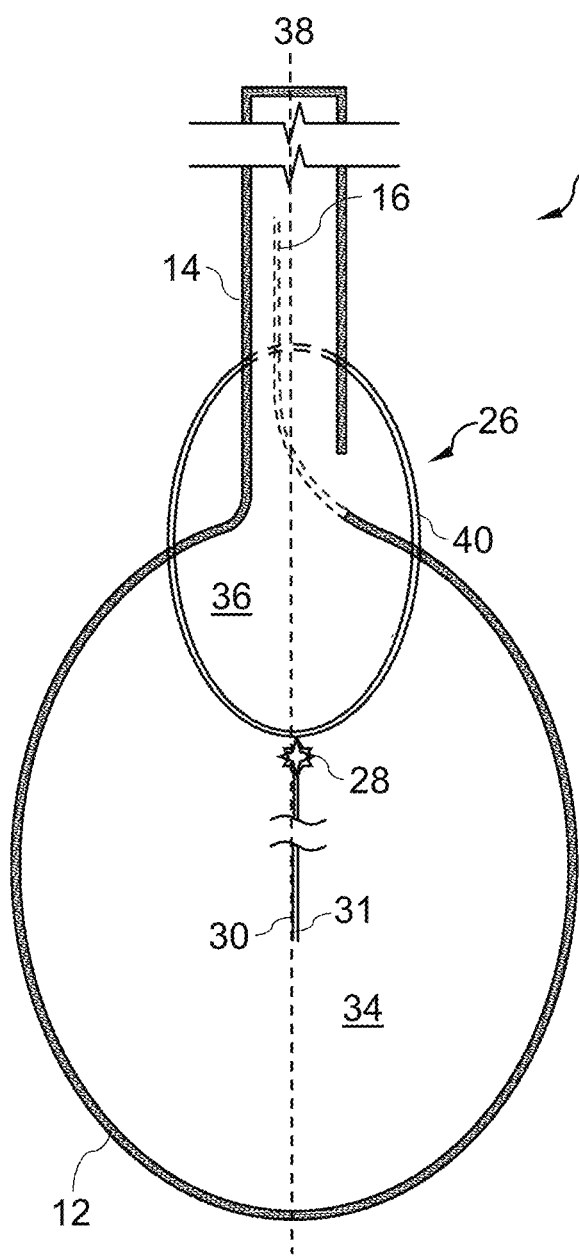
FIGS. 1A-1B depicts a top view of one embodiment of a breakaway suture construct assembly.
Figure 1B:
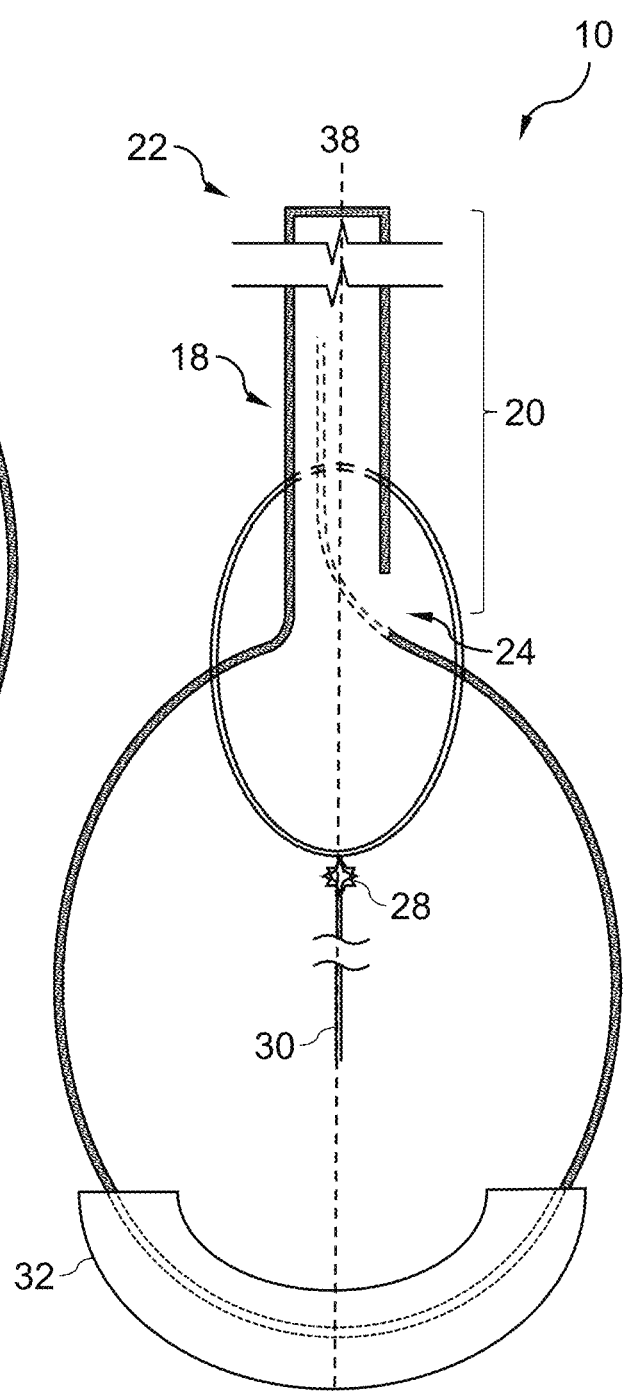
Figure 2A:
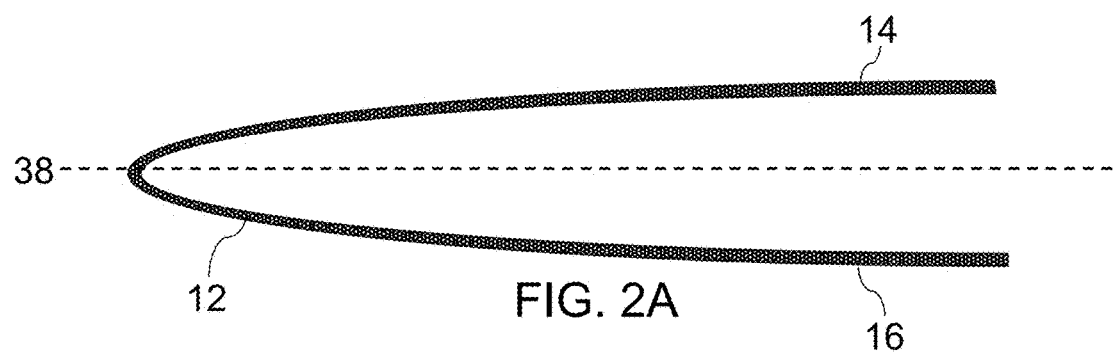
FIGS. 2A-2C depicts a top view of a second embodiment of a breakaway suture construct assembly.
Figure 2B:
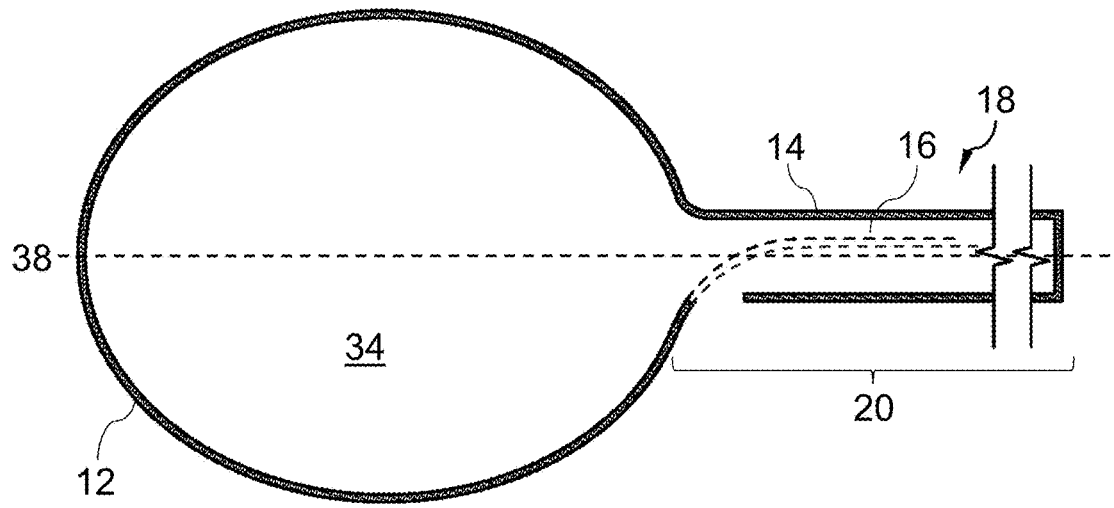
Figure 2C:
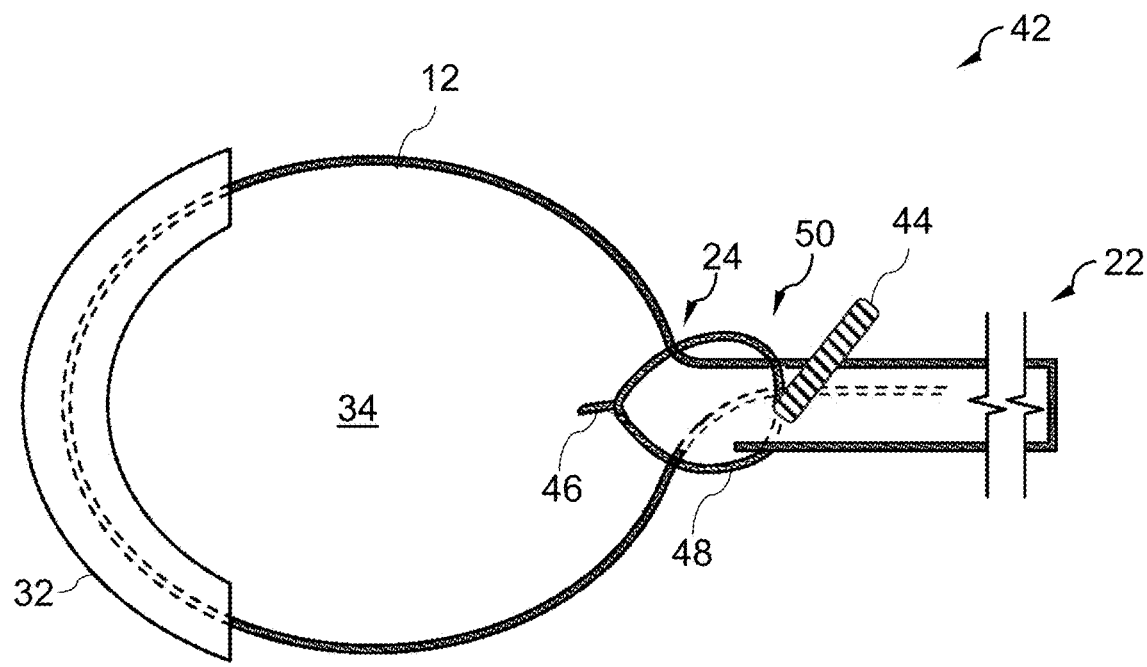
Figure 2D:
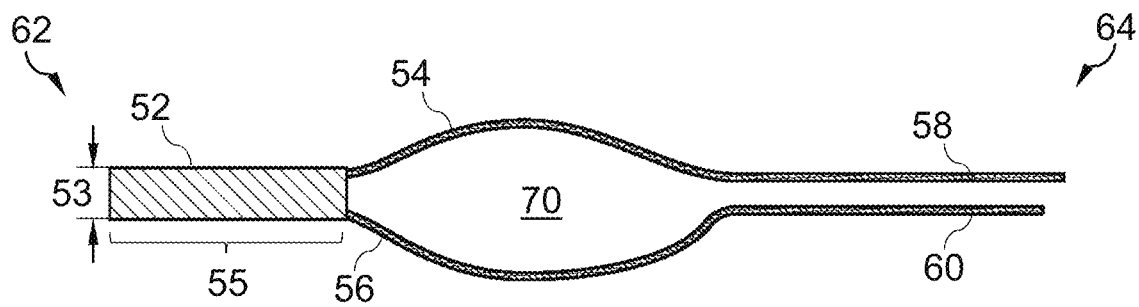
FIGS. 2D-2F depicts one embodiment of a locking mechanism with different configurations of breakaway suture construct assembly of FIGS. 2A-2C.
Figure 2E:
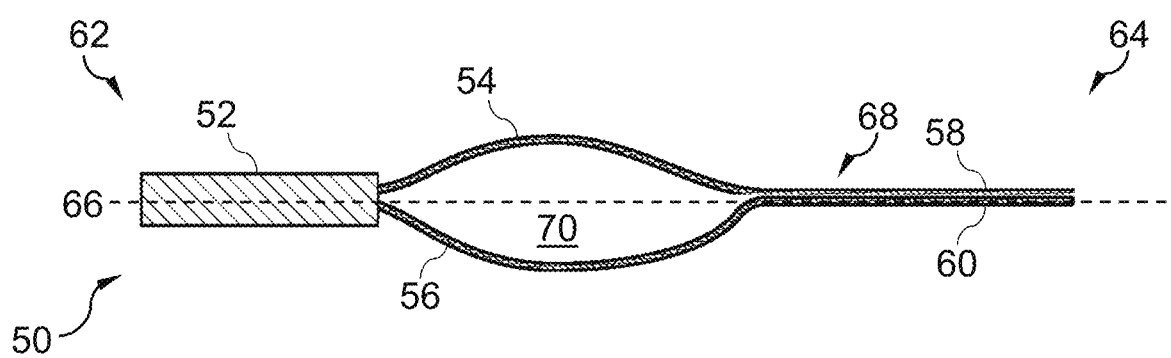
Figure 2F:
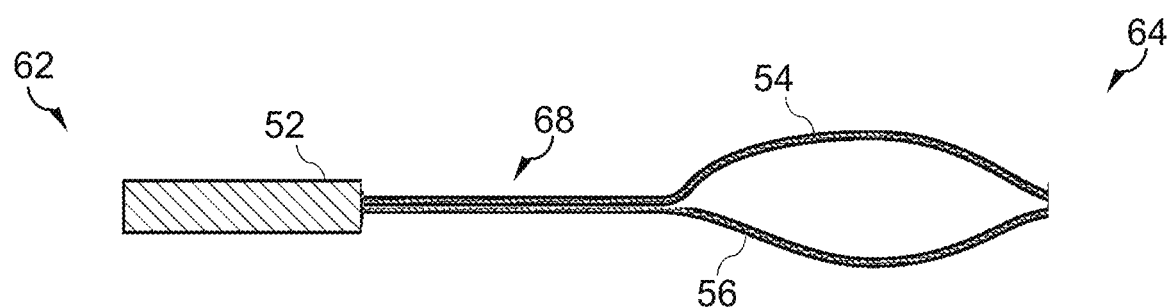
Figure 3A:
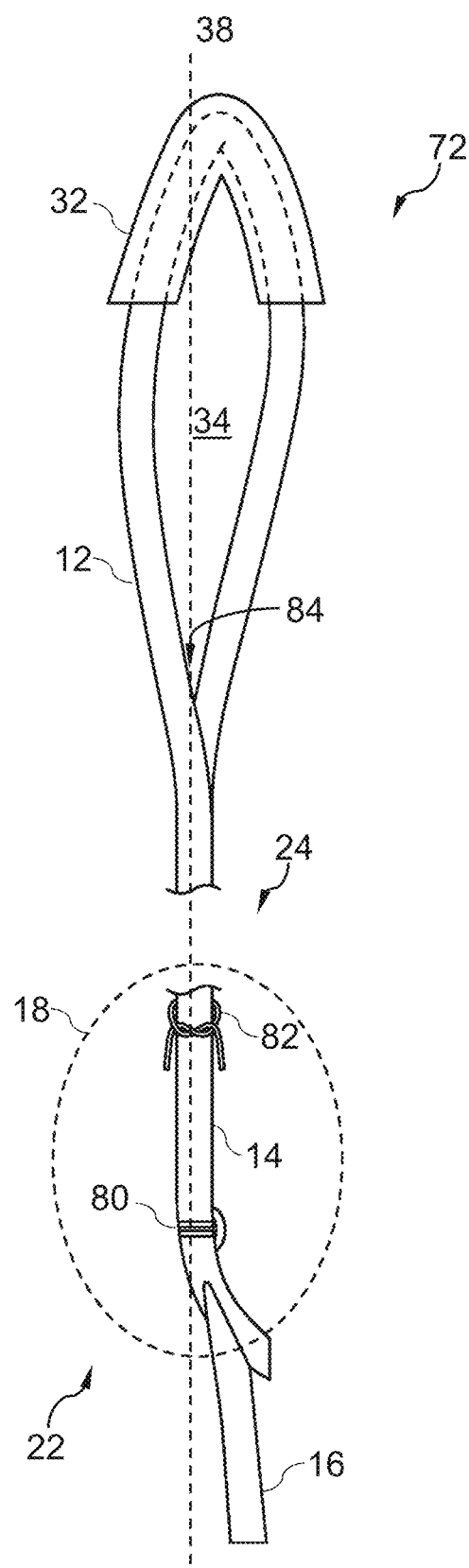
FIGS. 3A-3D depicts a side view and magnified view of a third embodiment of a suture construct assembly.
Figure 3B:
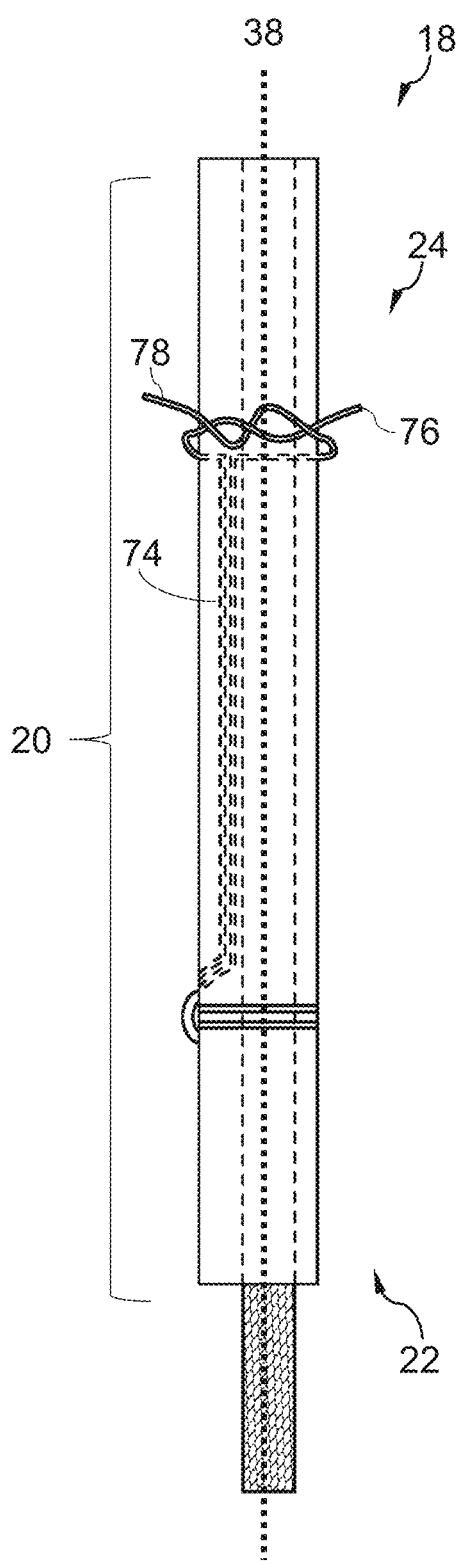
Figure 3C:
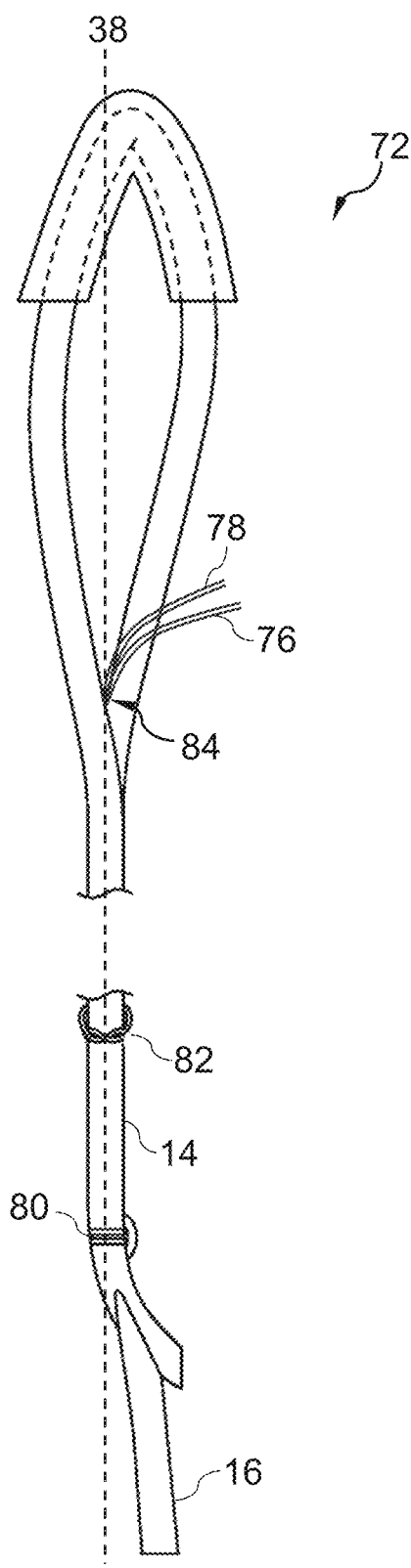
Figure 3D:
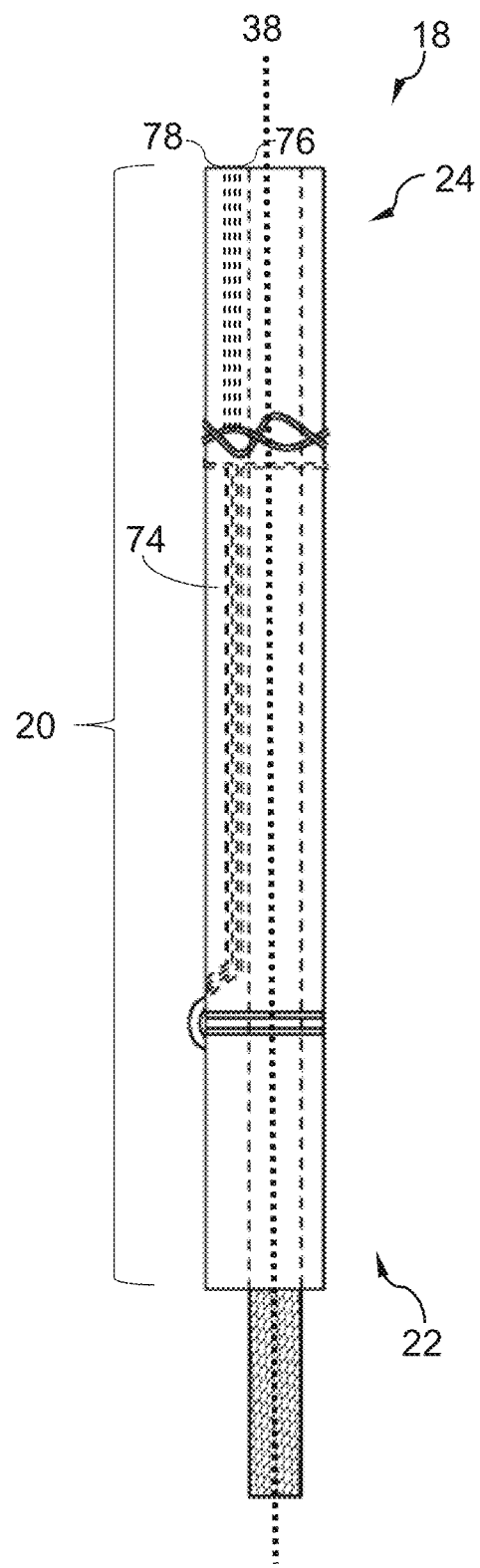

FIGS. 1A-1B depicts plan view of a first embodiment of breakaway suture construct assembly 10. The breakaway suture construct assembly 10 comprises a suture 12 and a locking mechanism 26. The breakaway suture construct assembly may further comprise an anchoring element 32. The suture 12 comprises a longitudinal axis 38, a first tail end 14 and a second tail end 16. The suture 12 further comprises a material and a suture length (not shown).

The second tail end 16 of the suture 12 is inserted into the first tail end 14 of the suture 12 to create a splice region 18. Accordingly, the second tail end 16 of the suture 12 is inserted into and/or within the first tail end 14 of the suture 12 and parallel to the longitudinal axis 38 of the suture 12 to create a splice region 18. The splice region 18 comprises a splice region length 20 and a splice region width (not shown). This allows the first tail end 14 and the second tail end 16 of the suture 12 to be parallel to each other. The splice region 18 includes a first end 24 and a second end 22. The splice region 18 may further include a lumen (not shown).

At least a portion of the locking mechanism 26 disposed through the splice region 18 of the suture 12 is intended to effectively "lock" or prevent unwanted sliding or movement of the first tail end 14 relative to the second tail end 16 of the suture 12. The locking mechanism 26 may comprise a suture strand or suture. The locking mechanism 26 comprises a first tail end 30 and a second tail end 31. The at least a portion of the locking mechanism 26, and/or a first tail end 30 or second tail end 31 of the locking mechanism 26 pierces the splice region 18 at a first location transverse to the longitudinal axis 38 of the suture 12 and exits out a second location transverse to the longitudinal axis 38 of the suture 12.

Accordingly, at least a portion of the locking mechanism 26, and/or the first tail end 30 or second tail end 31 of the locking mechanism 26 extends through the splice region 18 at a first location transverse to the longitudinal axis 38 of the suture 12 and exits out a second location transverse to the longitudinal axis 38 of the suture 12.

In another embodiment, the at least a portion of the locking mechanism 26, and/or first tail end 30 or second tail end 31 of the locking mechanism 26 pierces a first sidewall of the splice region 18 transverse to the longitudinal axis 38 of the suture 12 at a first location and extends through the lumen (not shown) of the splice region 18, the first tail end 14 and the second tail end 16 of the suture 12 within the splice region 18, to exit out a second sidewall of the splice region 18 at a second location.

The first location and the second location are at opposing or opposite locations. The first location and the second location are at least 170 degrees apart. The first location and the second location are substantially 180 degrees apart. The first location and the second location are disposed between the first end and the second end of the splice region 18. The first and second location may be disposed adjacent to the first end 24.

The first tail end 30 and the second tail end 31 of the locking mechanism 26 may be coupled to each other to create a releasable locking point 28 and a locking loop 36. The releasable locking point 28 may comprise a "luggage tag," a knot, a hitch (e.g., lanyard hitch or cow hitch), a splice region, stitch, and/or any combination thereof. The splice region may comprise a locking splice or a sliding splice. The releasable locking point 28 may comprise any temporary lock that requires only a minimal load or force to release. The first tail end 30 and the second tail end 31 of the locking mechanism 26 may be trimmed or the length may be kept. Alternatively, the first tail end 30 may be inserted into the second tail end 31 to create a splice region (not shown) of the locking mechanism 26. The locking mechanism 26 may be cut, opened, pulled apart, untied and/or otherwise removed from the splice region 18, thereby releasing the second tail end 16 from the first tail end 14 of the suture 12 from the splice region 18.

FIGS. 2A-2F depicts plan view of a first embodiment of breakaway suture construct assembly 42 and the respective locking mechanism 50. The breakaway suture construct assembly 12 comprises a suture 12 and a locking mechanism 50. The breakaway suture construct assembly may further comprise an anchoring element 32. The suture 12 comprises a longitudinal axis 38, a first tail end 14 and a second tail end 16. The suture 12 further comprises a material and a suture length (not shown).

The second tail end 16 of the suture 12 is inserted into the first tail end 14 of the suture 12 to create a splice region 18 and a suture or flexible loop 34. Accordingly, the second tail end 16 of the suture 12 is inserted into and/or within the first tail end 14 of the suture 12 and parallel to the longitudinal axis 38 of the suture 12 to create a splice region 18 and/or a flexible loop 34. The splice region 18 comprises a splice region length 20 and a splice region width (not shown). This allows the first tail end 14 and the second tail end 16 of the suture 12 to be parallel to each other. The splice region 18 includes a first end 24 and a second end 22. The splice region 18 may further include a lumen (not shown).

The locking mechanism 50 may comprise one or more suture strands or suture and a tag 52. More specifically, the locking mechanism 52 comprises a longitudinal axis 66, a tag 52, a first strand 54, a second strand 56, a first end 62 and a second end 64. The first strand 54 includes a first strand end 58, and the second strand 56 includes a second strand end 60. The first strand 54 comprises a first strand width and the second strand 56 comprises a second strand width. At least a portion of the locking mechanism 50 may comprise a one or more suture strand or suture 58, 60. The locking mechanism 50 may further comprise a longitudinal axis 66. The one or more suture strands, a first strand 54 and the second strand 56 comprises a suture material. The one or more suture strands, a first strand 54 and the second strand 56 comprises suture textile construction.

The tag 52 comprises a tag material, a tag width 53, a tag length 55 and a tag shape. The tag width 55 is larger than the first strand width and the second strand width. The tag width 55 comprises a length that is at least 2 times greater than the first strand width and the second strand width. The tag shape may comprise any shape, including a circle, an oval, an ellipse and/or any polygonal shape. The tag length comprises a shorter length than the first strand length and the second strand length. The tag 52 may comprise a textile construction. The tag material may comprise flexible polymer. The tag material and the suture material may comprise the same material or different material. The tag textile construction may comprise the same or different suture textile construction. The tag is disposed within the first end 62 of the locking mechanism 50.

The at least a portion of the locking mechanism 50, a first strand end 58 and/or second strand end 60 of the locking mechanism 50 pierces the splice region 18 at a first location transverse to the longitudinal axis 38 of the splice region 18 and/or suture 12 and exits out a second location transverse to the longitudinal axis 38 of the suture 12 and/or the splice region 18. Accordingly, at least a portion of the locking mechanism 50, the first strand end 58 and/or second strand end 60 of the locking mechanism 50 extends through the splice region 18 at a first location transverse to the longitudinal axis 38 of the suture 12 and/or splice region and exits out a second location transverse to the longitudinal axis 38 of the suture 12 and/or splice region 18.

In another embodiment, the at least a portion of the locking mechanism 26, the first strand end 58 and/or the second tail end 60 of the locking mechanism 50 pierces a first sidewall of the splice region 18 transverse to the longitudinal axis 38 of the suture 12 and/or the splice region 18 at a first location and extends through the lumen (not shown) of the splice region 18, which the lumen of the splice region 18 includes the first tail end 14 and the second tail end 16 of the suture 12, to exit out a second sidewall of the splice region 18 at a second location.

The first location and the second location are at opposing or opposite locations. The first location and the second location are at least 170 degrees apart. The first location and the second location are substantially 180 degrees apart. The first location and the second location are disposed between the first end and the second end of the splice region 18. The first and second location may be disposed adjacent to the first end 24 of the splice region 18.

The first strand end 58 and/or the second strand end 60 of the locking mechanism 50 is tensioned or pulled until a portion of the tag 52 engages or contacts the outer surface or outer diameter of the splice region 18 at the first location. The first strand end 58 is coupled to the second strand end 60 to create a releasable locking point 46 and a strand loop 48 with a strand loop opening 70. The releasable locking point 46 is intended to effectively "lock" or prevent unwanted sliding or movement of the first tail end 14 relative to the second tail end 16 of the suture 12. The coupling may comprise a knot, a splice region, stitch, and/or any combination thereof. In one exemplary embodiment, the releasable locking point 46 may comprise a locking splice or a sliding splice 68. The locking splice may comprise a brummel splice. The locking mechanism 50 may be cut, opened, pulled apart, untied and/or otherwise removed from the splice region 18, thereby releasing the second tail end 16 from the first tail end 14 of the suture 12. The first tail end 58 and the second tail end 60 of the locking mechanism 26 may be trimmed or the length may be kept.

FIGS. 3A-3D depict a side view and cross-sectional view of a third alternate embodiment of a breakaway suture construct assembly 72. The breakaway suture construct assembly 72 comprises a suture 12 and a locking mechanism 74. The breakaway suture construct assembly may further comprise an anchoring element 32. The suture 12 comprises a longitudinal axis 38, a first tail end 14 and a second tail end 16. The suture 12 further comprises a material and a suture length (not shown).

The second tail end 16 of the suture 12 is inserted into the first tail end 14 of the suture 12 to create a splice region 18. Accordingly, the second tail end 16 of the suture 12 is inserted into and/or within the first tail end 14 of the suture 12 and parallel to the longitudinal axis 38 of the suture 12 to create a splice region 18 and a flexible suture loop 34. The splice region 18 comprises a splice region length 20 and a splice region width (not shown). This allows the first tail end 14 and the second tail end 16 of the suture 12 to be parallel to each other. The splice region 18 includes a first end 24 and a second end 22. The splice region 18 may further include a lumen (not shown).

At least a portion of the locking mechanism 74 is disposed through a portion pf the splice region 18 of the suture 12 to effectively "lock" or prevent unwanted sliding or movement of the first tail end 14 relative to the second tail end 16. The locking mechanism 72 may comprise a suture strand or suture. The locking mechanism 72 comprises a first tail end 76 and a second tail end 78. The at least a portion of the locking mechanism 72, the first tail end 76 and/or the second tail end 78 of the locking mechanism 74 pierces the splice region 18 and/or first tail end 14 at a first location transverse to the longitudinal axis 38 of the suture 12 to create a first releasable locking point 80. The first releasable locking point 80 and first location disposed at the second end and/or adjacent to the second end 22 of the splice region 18.

The at least a portion of the locking mechanism 72, a first tail end 76 and/or second tail end 78 of the locking mechanism 74 exits out a second location transverse to the longitudinal axis 38 of the suture 12. Accordingly, at least a portion of the locking mechanism 74, the first tail end 76 and/or second tail end 78 of the locking mechanism 74 extends along the longitudinal axis 38 of the splice region from the second end or first location towards the first end 24 of the splice region 18 and exits out transverse to the longitudinal axis 38 of the suture at a second location. Furthermore, at least a portion of the locking mechanism 74, the first tail end 76 and/or second tail end 78 of the locking mechanism 74 extends parallel to the longitudinal axis 38 of the suture 12 from the first location through the splice region 18 towards the first end 24 and exits out a second location transverse to the longitudinal axis 38 of the suture 12. The second location is at the first end 24 of the splice region 18 and/or adjacent to the first end 24 of the splice region 18.

In another embodiment, the at least a portion of the locking mechanism 74, the first tail end 76 and/or second tail end 78 of the locking mechanism 74 pierces a first sidewall of the first tail end 14 and/or the splice region 18 of the suture 12 transverse to the longitudinal axis 38 of the suture 12 at a first location to create a first releasable locking point 80. The at least a portion of the locking mechanism 74, the first tail end 76 or second tail end 78 of the locking mechanism 74 extends through the lumen (not shown) of the splice region 18 from the first location towards the second end 24 of the splice region 18, to exit out a second sidewall of the splice region 18 and/or a first tail end 14 at a second location transverse to the longitudinal axis 38 of the suture 12.

In another embodiment, the at least a portion of the locking mechanism 74, the first tail end 76 or second tail end 78 of the locking mechanism 74 extends through the splice region 18, the first tail end 14 of the suture 12 and the second tail end of the suture 12 transverse to the longitudinal axis 38 of the suture 12 to exit out a third location. The piercing of splice region 18, the first tail end 14 of the suture 12 and the second tail end of the suture 12 is a temporary lock to prevent any significant undesirable movement relative to each other.

The first location and the third location are at opposing or opposite locations. The second location and the third location are at opposing or opposite locations. The first and second location are spaced apart and coaxially aligned. The first and second location are opposing the third location. The first location and the third location are at least 170 degrees apart. The second location and the third location are at least 170 degrees apart. The first location and the third location are substantially 180 degrees apart. The second location and the third location are substantially 180 degrees apart. The first location, second location and/or third location are disposed between the first end and the second end of the splice region 18. The second location and third location may be disposed adjacent to the first end 24 or disposed within the first end 24.

The first tail end 76 of the locking mechanism 74 at a second location and the second tail end 78 at a third location may be coupled to each other to create a second releasable locking point 82. The releasable locking points 80, 82 may comprise a "luggage tag," a standard knot (e.g., a single-over hand knot, a double-over hand knot, a square knot, a figure 8 knot, slip knot, and/or any combination thereof), a knot hitch (e.g., clove hitch, lanyard hitch, cow hitch, half-hitch, and/or any combination thereof), a splice region, stitch, and/or any combination thereof. The splice region may comprise a locking splice or a sliding splice. The releasable locking point 80, 82 may comprise any temporary lock that requires only a minimal load or force to release, or quick-release.

The first tail end 76 and/or the second tail end 78 of the locking mechanism 74 enters or pierces the splice region 18 near the second or third location to extend longitudinally through the remaining portion of the splice region 18 to exit out at or near the crux 84 of the suture loop 34. The first tail end 76 and/or the second tail end 78 of the locking mechanism 74 may be trimmed or the length may be kept. Alternatively, the first tail end 76 may be inserted into the second tail end 78 to create a locking mechanism splice region (not shown) of the locking mechanism 74. The locking mechanism 74 may be cut, opened, pulled apart, untied and/or otherwise removed from the splice region 18, thereby releasing the second tail end 16 from the first tail end 14 of the suture 12 from the splice region 18.

The suture 12, the locking mechanisms 26, 50, 74, and/or a portion of the locking mechanisms 26, 50, 74 may comprise a textile construction, the textile construction includes a woven, a braided, a knitted construction, and/or any combination thereof. The suture 12, the locking mechanisms 26, 50, 74, and/or a portion of the locking mechanisms 26, 50, 74 may comprise different suture shape types. The suture shape types comprise a round suture, a flat suture, and/or a round-to-flat suture.

The suture 12, the locking mechanisms 26, 50, 74, and/or a portion of the locking mechanisms 26, 50, 74 comprise a material. The material may comprise a ceramic, polymer and/or metal. The polymer may further include a thermoset or thermoplastic polymer. The material may comprise synthetic or natural suture materials. The material may include a non-biodegradable material or polymer and/or biodegradable material.

The non-biodegradable polymers may comprise nylons, polypropylenes, polyolefins, polyketones, polyamides, and polyesters. Suitable polyolefins include polyethylenes and polypropylenes, especially such polymers of high molar mass like ultra-high molar mass polyethylene (UHMWPE). Suitable polyamides include aliphatic, semi-aromatic and aromatic polyamides, like polyamide 6, polyamide 66 and their copolymers, and poly(phenylene terephthalamide). Suitable polyesters include aliphatic, semi-aromatic and aromatic polyesters, like poly (I-lactic acid) and its copolymers, polyethylene terephthalate (PET), polytrimethylene terephthalate (PTT), polyethylene naphthalate (PEN), polyethylene furanoate (PEF) and liquid crystalline aromatic copolyesters.

The biodegradable materials may comprise a natural or synthetic biodegradable material. Natural biodegradable polymers include chitosan, silk fibroin, fibrinogen, collagen and hyaluronic acid. Synthetic biodegradable polymers include poly(ε-caprolactone) (PCL), polydioxanone (PDA), PLA, PGA, copolymer PLGA, polytrimethylene carbonate (PTMC), and/or poly(p-dioxanone) (PDO). These materials have been proven to be biocompatible and have a controlled degradation rate, and their degradation products in-vivo have no toxic effects on tissues.

Semi-synthetic or bio-derived biocompatible polymers include materials like derivates of proteins and polysaccharides, such as cellulose. Synthetic biocompatible polymers include materials like poly (meth) acrylates, polyolefins, vinyl polymers, fluoropolymers, polyesters, polyamides, polysulfones, polyacrylics, polyacetals, polyimides, polycarbonates, polyethylenes, polyurethanes, including copolymers, compounds and blends thereof. Such synthetic polymers may be based on natural compounds like amino acids and/or on synthetic monomers.

Additional Breakaway Suture Construct Assemblies

In one embodiment, the anchor construct comprising: a first suture, the first suture comprising a first free end and a second free end; and a second suture, the second comprising a first free end and a second free end, the first free end of the second suture being threaded through a portion of the second free end of the second suture to create a splice and a flexible loop, at least a portion of the first suture piercing the second suture at a first location within the splice to create a first locked region, the first and second free ends of the first suture being threaded through a portion of the splice, the first free end of the first suture piercing through the first free end of the second suture and the second free end of the second suture to extend outwardly from a second location within the splice, and the second free end of the first suture piercing through the second free end of the second suture to extend outwardly from a third location, the first free end of the first suture and the second free end of the first suture being secured over the outer surface of the splice to create a second locked region.

In another embodiment, the anchor construct comprises: a first suture, the first suture comprising a first end and a second end, at least a portion of the first end being disposed within the second end to create a flexible loop and a splice; and a second suture, the second suture comprising a first end and a second end, at least a portion of the second suture being pierced through the second end of the second suture at a first location within the splice to create a first locked point, the at least a portion of the first end of the second suture and at least a portion of the second end of the second suture being threaded through the splice along its longitudinal axis, at least a portion of the first end of the second suture being pierced through the second end of the first suture to extend outwardly at a second location within the splice, and at least a portion of the of the second end of the second suture being pierced though the first end of the first suture and the second end of the first suture to extend outwardly at a third location within the splice, at least a portion of the first end of the second suture and at least a second end of the second suture secured over the outer surface of the splice to create a second locked point.

In another embodiment, the anchor construct comprises: a first suture, the first suture comprising a longitudinal axis, a first tail end and a second tail end, the first tail end of the first suture being threaded longitudinally through a portion of the second tail end of the first suture to create a splice region and a flexible loop, the splice region comprising a first end and a second end; a second suture, the second suture comprising a first portion, a second portion, a first tail end and a second tail end, the first portion of the second suture piercing the second tail end of the first suture transverse to the longitudinal axis of the first suture to create a first releasable locking point at a first location, the second portion contacting an outer diameter of the splice region at a second location to create a second releasable locking point; and an anchoring element.

The first and/or second locked point or region comprises different locking or securing techniques. The different locking or securing techniques may comprise slip knots, friction knots, adhesive and/or holding knots. The holding knots may comprise a single over hand knot, a double-over hand knot, a square knot, a half-hitch, and/or any combination thereof. The first and/or second locked points or regions created by the stitch strand (e.g., first or second suture) prevent movement of the suture or repair strand (e.g., first or second suture). In one embodiment, the first locked point comprises a slip knot and the second locked point comprises a double over-hand knot. The first and/or second locked point may be disposed over an outer surface of the splice and/or an end of the suture or repair strand (e.g., first or second suture).

Methods of Assembly of Breakaway Suture Construct Assemblies

Figure 4A:
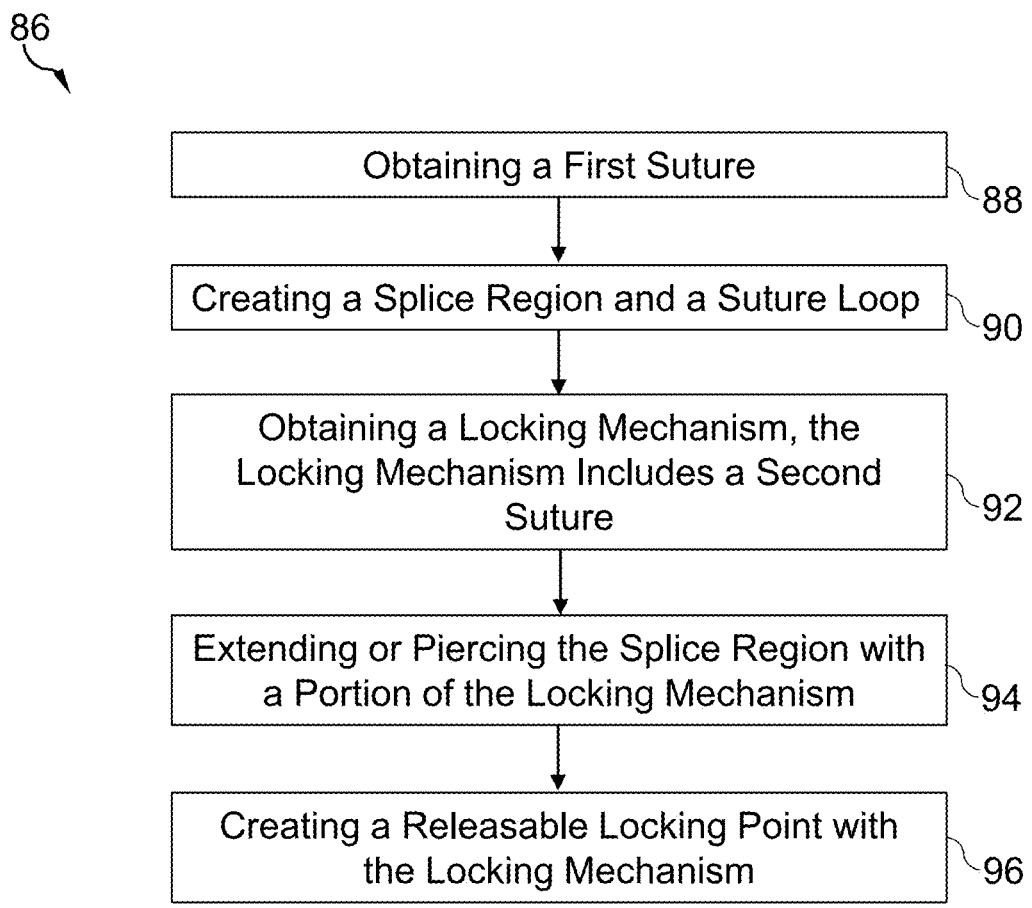
FIG. 4A-4E illustrates flowcharts with different embodiments of methods to assemble the breakaway suture construct of FIGS. 1A-1B, 2A-2C, and 3A-3D.

FIGS. 4A-4E and 5A-5Q illustrates methods of assembling 86, 98, 112 the break away suture constructs 10, 42, 72. As shown in FIG. 4A, the method of assembling 86 the breakaway suture construct 86 comprises the steps of: obtaining a first suture with a first tail end and a second tail end 88; creating a splice region and a suture loop by inserting the second tail end of the first suture into the first tail end of the first suture, the splice region including a longitudinal axis, a first end and a second end, the first tail end and the second tail end of the first suture are parallel to each other 90; obtaining a locking mechanism, the locking mechanism comprises a second suture, the second suture includes a first free end and a second free end 92; extending the first free end of the second suture transverse to the longitudinal axis of the splice region at a first location through the splice region and out a second location transverse to the longitudinal axis of the splice region, the first location and second location are on opposing sides of the splice region 94; and coupling the first free end of the second suture to the second free end of the second suture to create a releasable locking point 96. The releasable locking point may comprise a standard knot, a knot hitch and/or a locking splice. The releasable locking point may contact a portion of an outer diameter of the splice region. The releasable locking point may be disposed adjacent to the outer diameter of the splice region. The first location and second location are disposed between the first and second ends of the splice region.

Figure 4B:
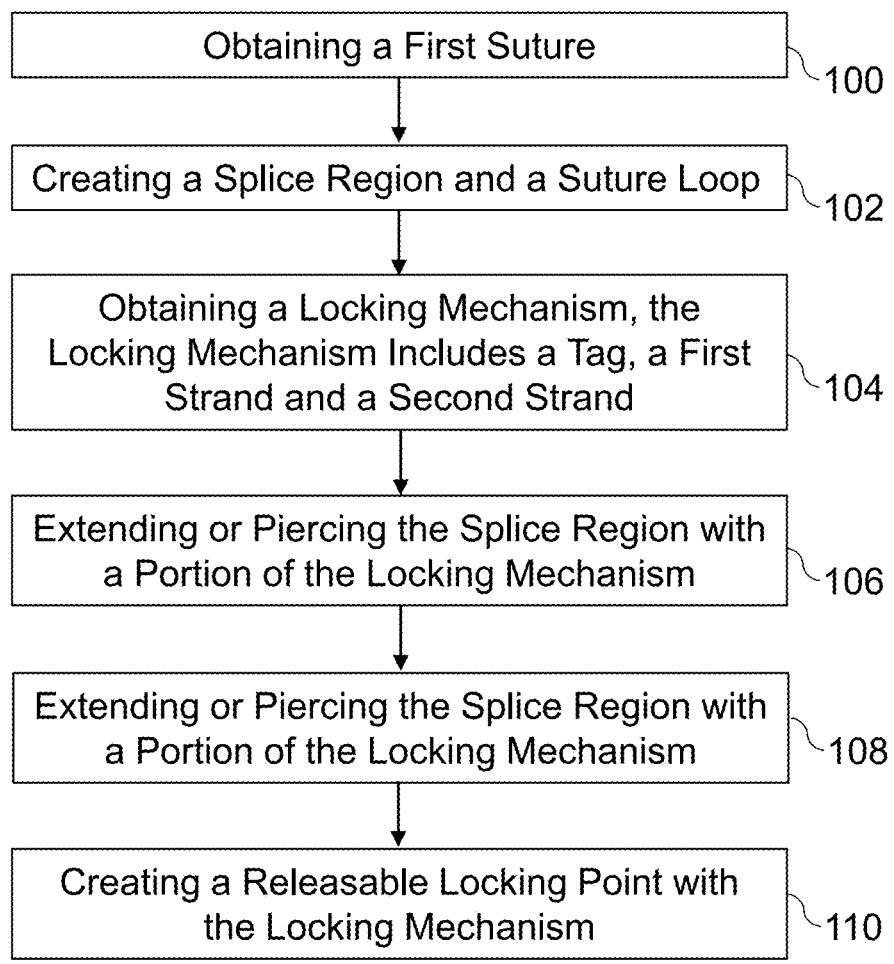
Figure 4C:
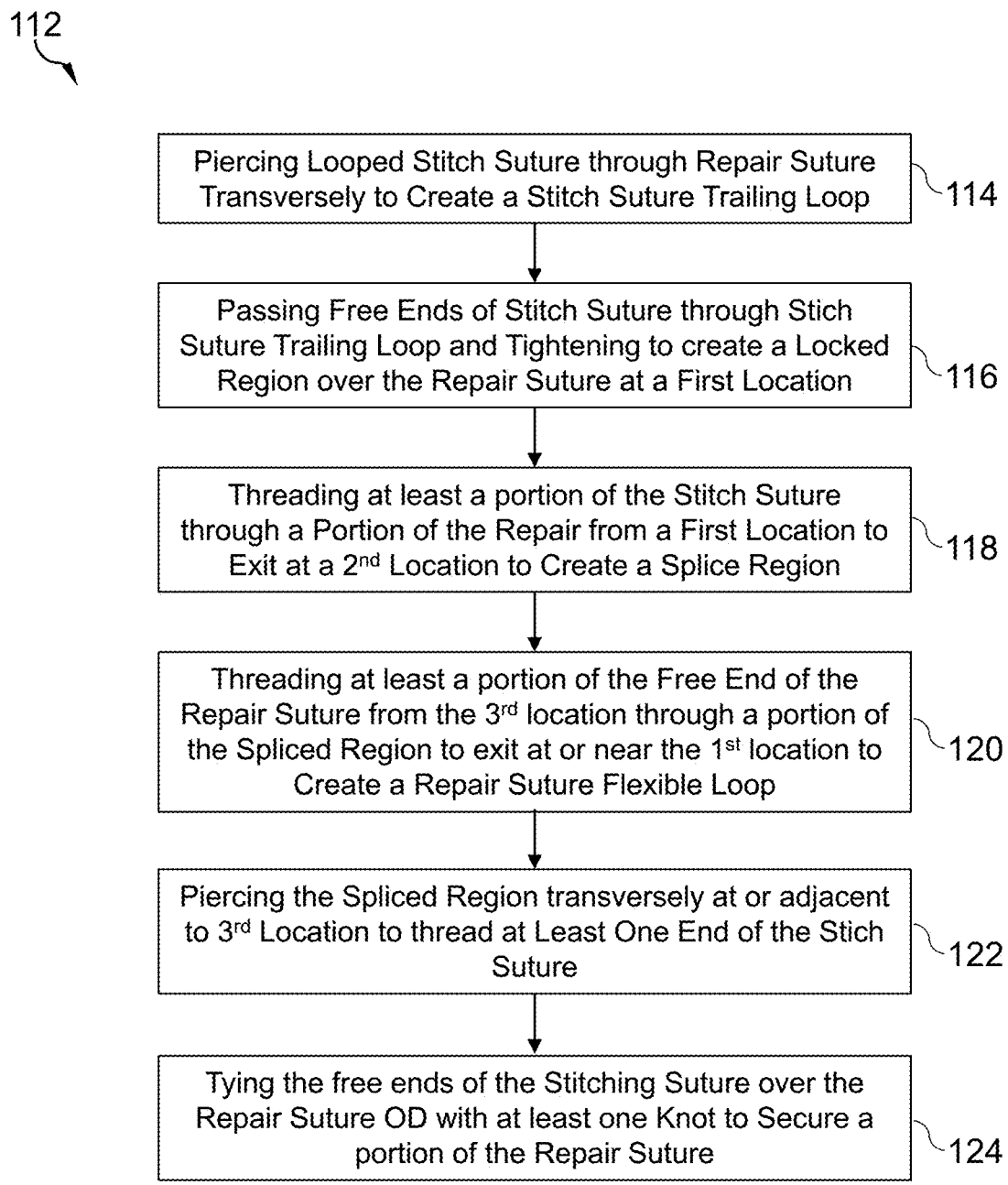

As shown in FIG. 4B, the method of assembling 98 the breakaway suture construct 86 comprises the steps of: obtaining a first suture with a first tail end and a second tail end 100; creating a splice region and a suture loop by inserting the second tail end of the first suture into the first tail end of the first suture, the splice region including a longitudinal axis, a first end and a second end, the first tail end and the second tail end of the first suture are parallel to each other 102; obtaining a locking mechanism, the locking mechanism comprises a tag, a first strand with a first strand end and a second strand with a second strand end 104; extending the first strand end of the locking mechanism transverse to the longitudinal axis of the splice region at a first location through the splice region and out a second location transverse to the longitudinal axis of the splice region, the first location and second location are on opposing sides of the splice region 106; engaging the tag of the locking mechanism onto a portion of outer diameter or outer surface of the splice region 108; and coupling the first strand end of the locking mechanism to the second strand end of the locking mechanism to create a releasable locking point 110. The releasable locking point may comprise a standard knot, a knot hitch and/or a locking splice. The releasable locking point may contact a portion of an outer diameter of the splice region. The releasable locking point may be disposed adjacent to the outer diameter of the splice region. The first location and second location are disposed between the first and second ends of the splice region. The locking mechanism may comprise a textile construction and/or at least a portion of the locking mechanism may comprise a textile construction. The tag, the first strand and/or a second strand of the locking mechanism comprises a textile construction.

Figure 4D:
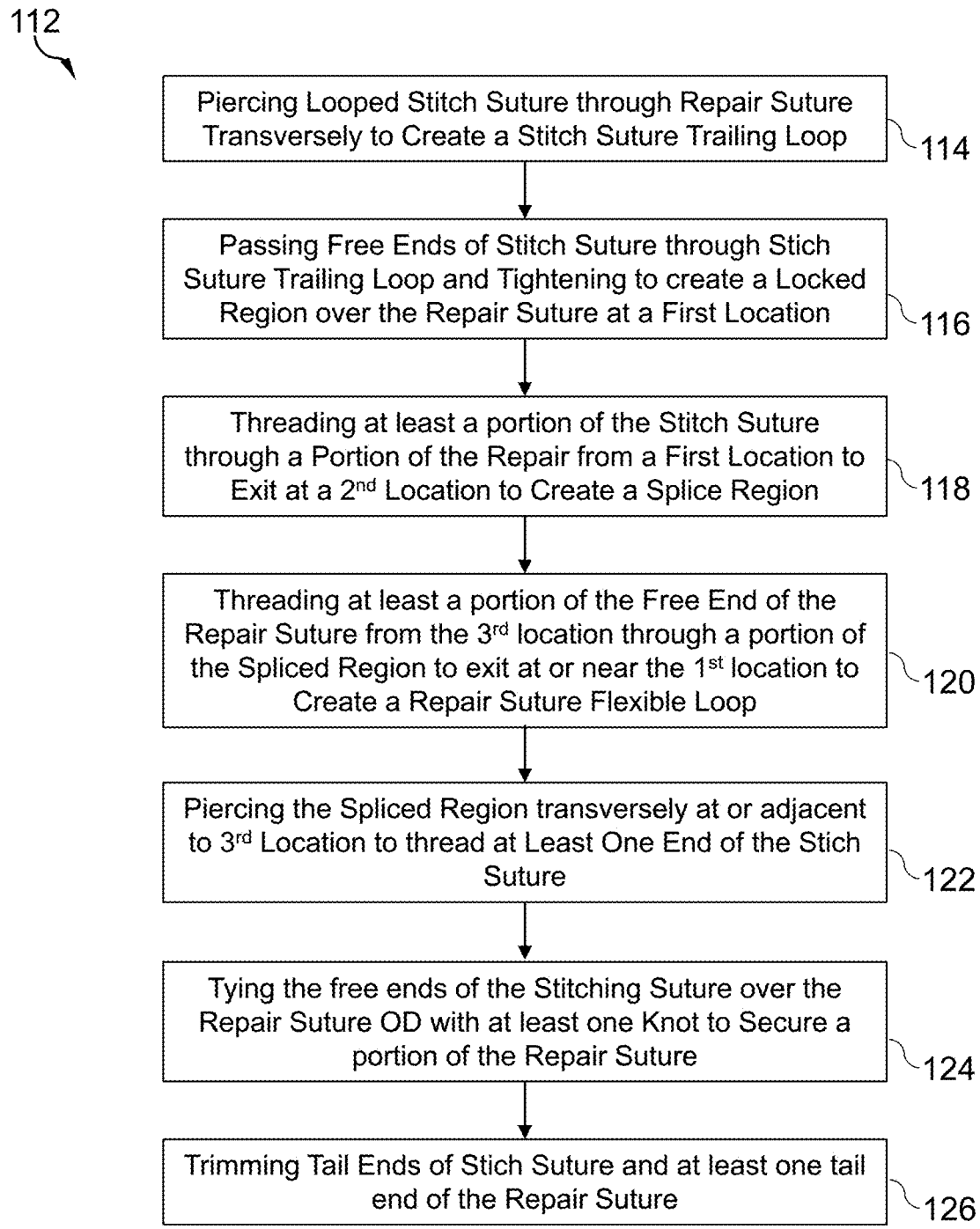
Figure 4E:
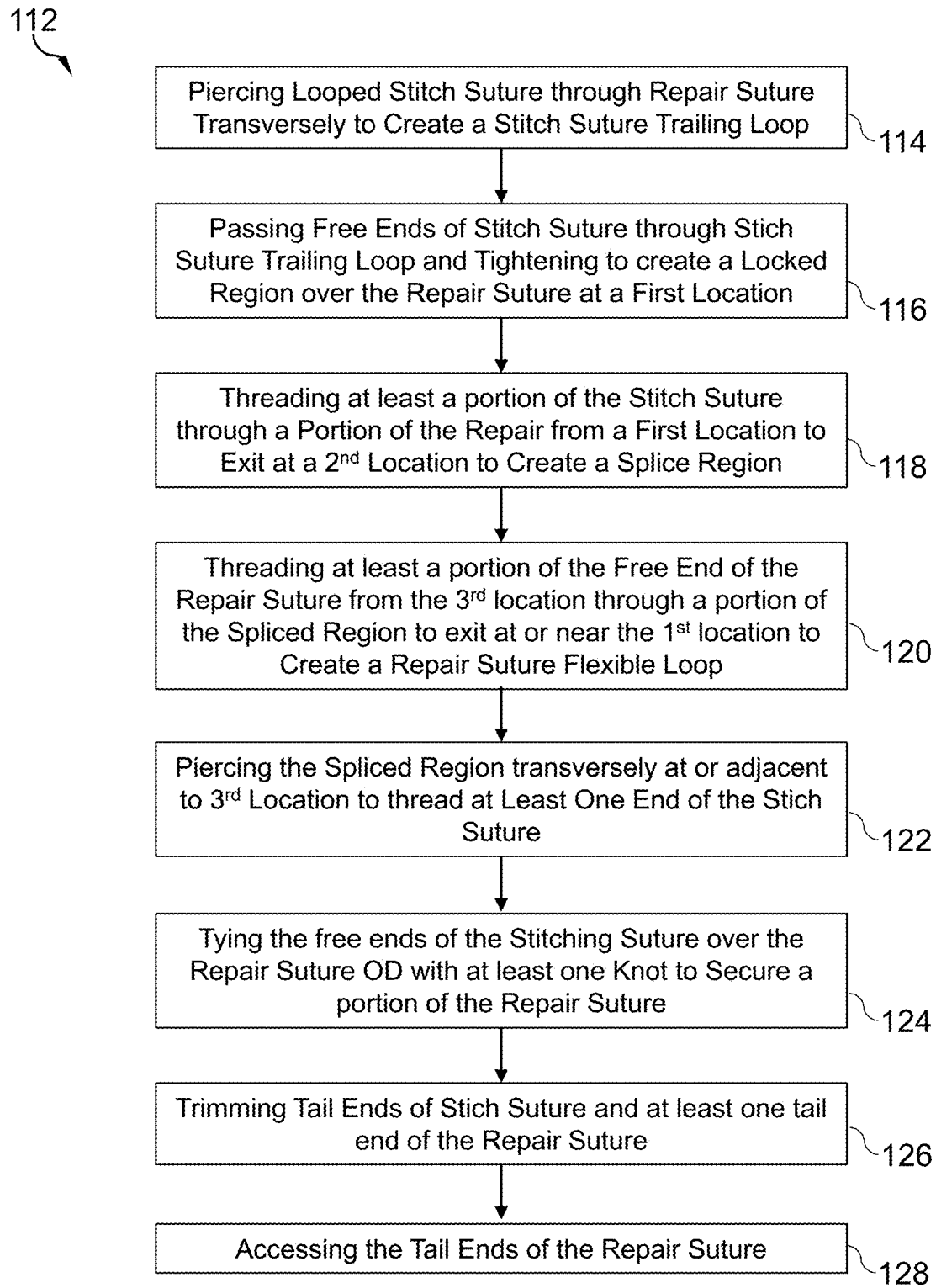

As shown in FIGS. 4C-4E and 5A-5R, the method of assembling 112 a suture construct comprises the steps of: providing a first suture and a second suture, the first suture comprising a first end and a second end, and the second suture comprising a first end and a second end; piercing a portion of the second suture through a portion of the second end of the first suture to create a trailing loop 114; securing a portion of the second suture to a portion of the first end of the first suture by passing a portion of the first and second free ends of the second suture through the trailing loop to create a first locked point at a first location 116; threading the first and second ends of the second suture longitudinally towards a second end to extend outwardly at a second location 118; threading the second end of the first suture longitudinally through the first end of the first suture to create a splice region and a flexible loop 120; piercing a first end of the second suture through the second end and first end of the first suture to extend outwardly at a third location 122; and securing a portion of the first end and the second end of the second suture over the outer surface of the splice region to create a second locked point 124. The method further comprises the step of: trimming the first and second ends of the second suture and the second end of the first suture 126 as shown in FIG. 4D. The method further comprises the step of: accessing the first and second ends of the first suture 128 as shown in FIG. 4E.

The method further comprises the step of: threading the first and/or second ends of the second suture through a portion of the splice towards the crux of the flexible loop. The method further comprises the step of: providing a first suture and a second suture, the first suture comprises a first end and a second end, and the second suture comprises a first end and a second end. The first or second suture may comprise a round suture, a flat suture and/or round-to-flat suture. The first end of a first or second suture may comprise the round portion of a round-to-flat suture and the second end of the first or second suture may comprise the flat portion of the round-to-flat suture. Alternatively, the first end of the first or second suture and the second end of the first or second suture may comprise round suture ends.

Figure 5A:
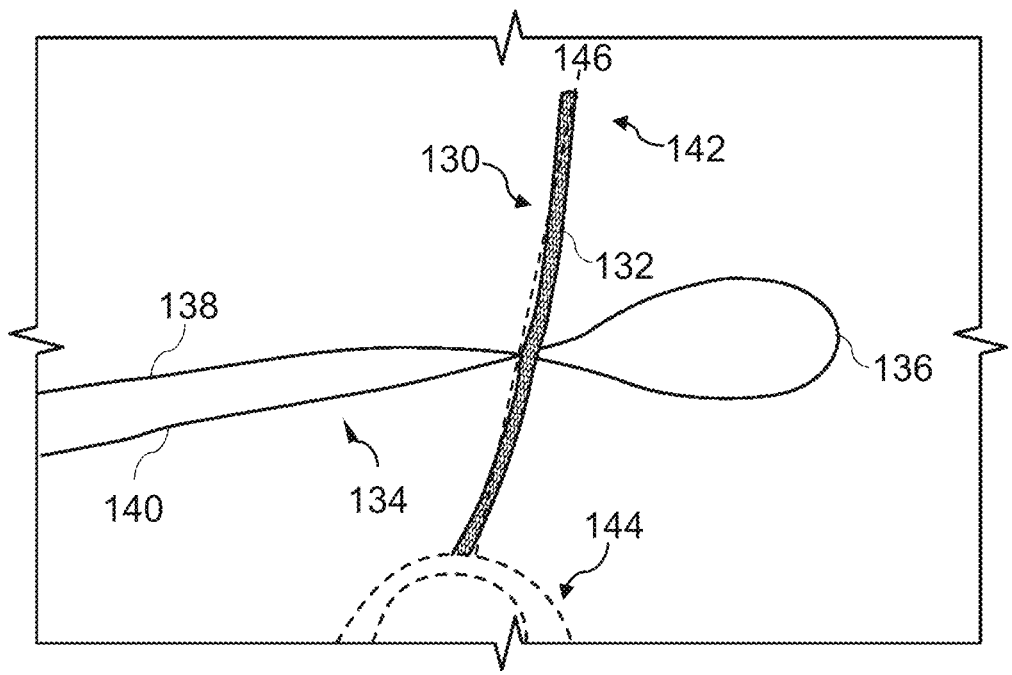
FIGS. 5A-5R illustrate a method of assembling the suture construct assembly of FIGS. 3A-3D.

FIG. 5A illustrates the step of piercing a portion of the second suture or locking mechanism through a portion of the second end of the first suture to create a trailing loop 114. The locking mechanism or second suture 134 is folded in half to create a "U" and a first free end 138 and a second free end 140. The first suture 130 comprises a first tail end 132 and a second tail end 154 not shown). At least a portion of the second suture and/or locking mechanism 134 is positioned transverse or substantially transverse to the longitudinal axis 146 of the first suture 130. A portion of the second suture 134 and/or the "U" or folded portion of the second suture or locking mechanism 134 is pierced through a portion of the first suture 130 and/or a first tail end 132 of the first suture 130 transversely to create a trailing loop 136. The piercing is near or adjacent to the second end 142. The piercing begins at a first sidewall of the first suture 130 and/or the first sidewall of the first tail end 132 of the first suture 130, and exits the opposite side or second sidewall of the first suture 130 and/or the second sidewall of the first tail end 132 of the first suture 130.

Figure 5B:
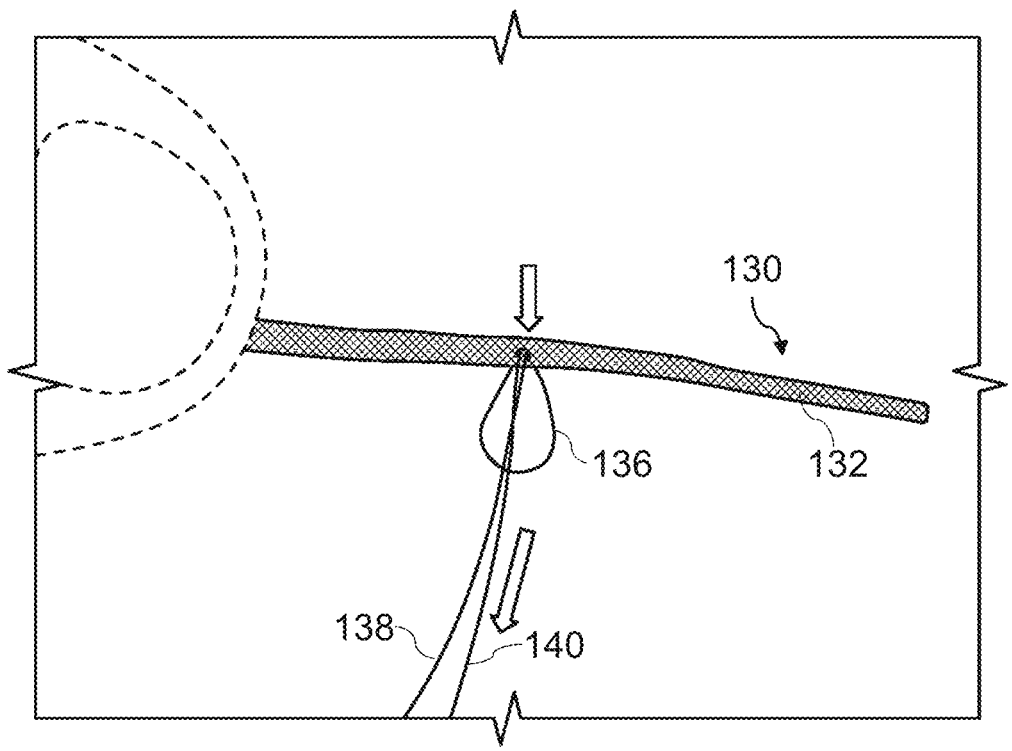
Figure 5C:
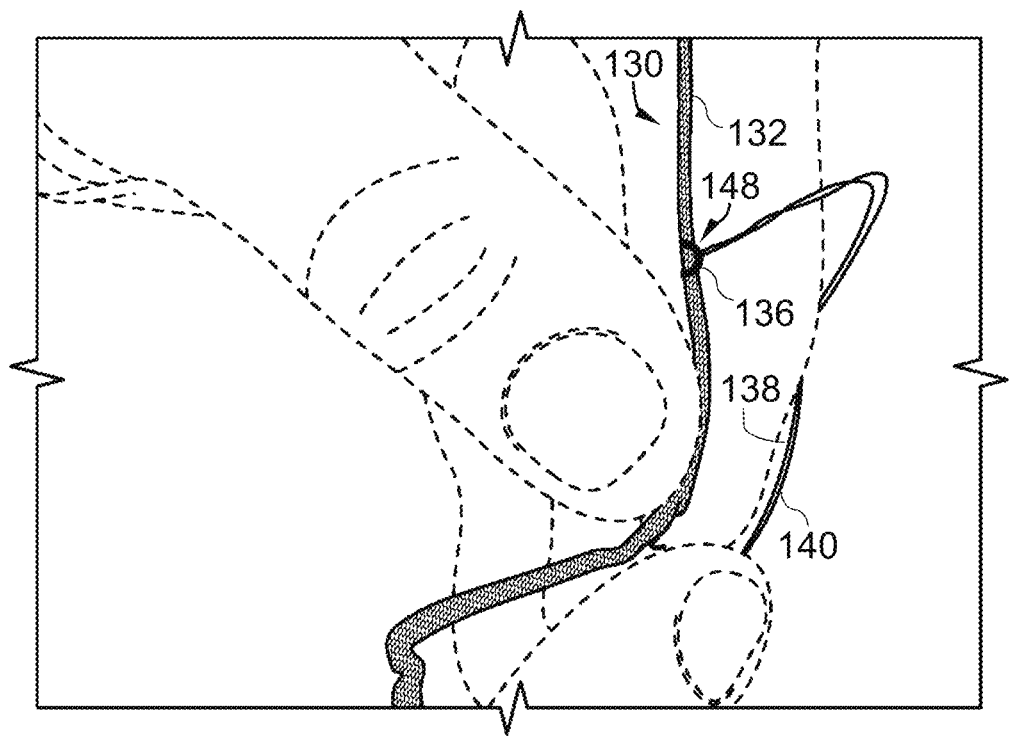

FIGS. 5B-5C illustrates the step of securing a portion of the second suture to a portion of the first end of the first suture by passing a portion of the first and second free ends of the second suture through the trailing loop to create a first locked point at a first location 116. At least a portion of first free end 138 and second free end 138 of the locking mechanism or second suture 134 inserted, passed and/or extended through the trailing loop 136 of the locking mechanism or second suture 134. The first free end 138 and the second free end 138 of the locking mechanism or second suture 134 are pulled or tensioned to create the first locked point 148 or locked region. The locked point or region 148 may comprise a friction knot, a hold knot, a slip knot, a standard knot and/or a hitch knot. In one exemplary embodiment, the locked point or region 148 may comprise a lanyard hitch knot or a cow hitch knot.

Figure 5D:
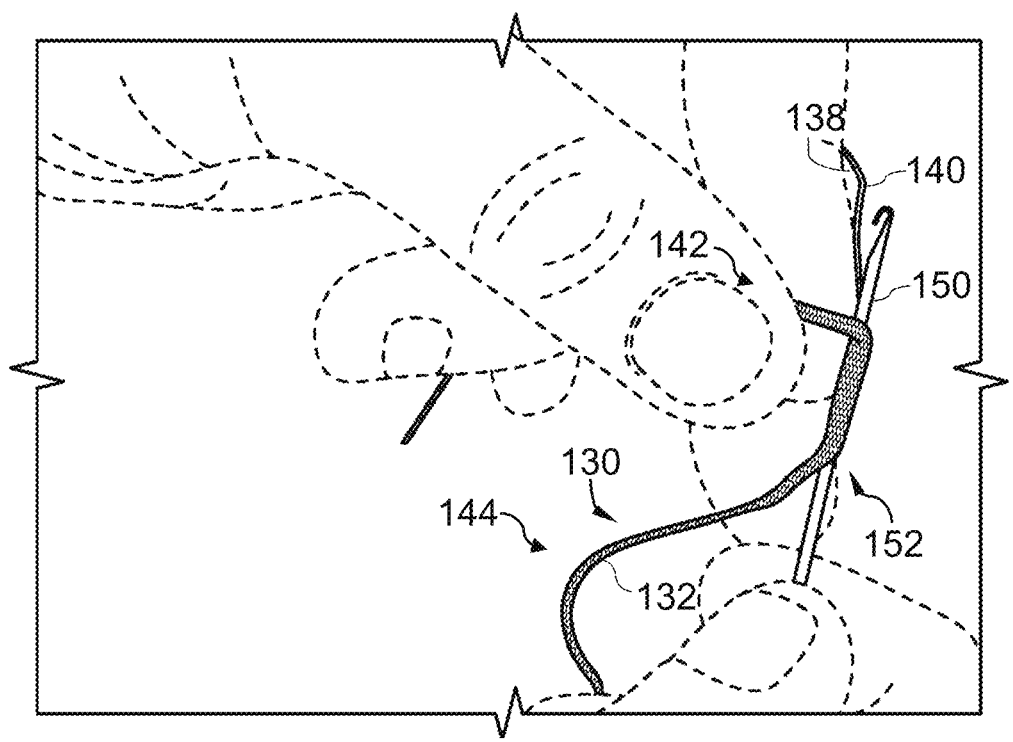
Figure 5E:
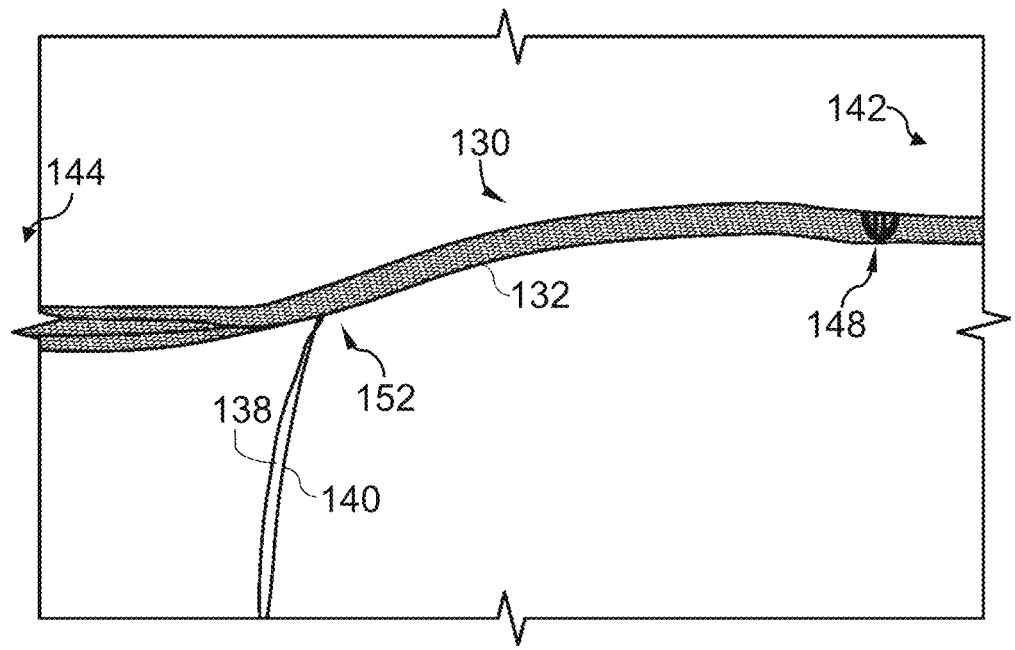

FIGS. 5D-5E illustrate the step of threading the first and second ends of the second suture longitudinally through the second end of the second suture to extend outwardly at a second location 118. The threading, piercing and/or extending of the first free end 138 and/or second free end 140 of the second suture or locking mechanism 134 may be performed by using a suture passing device 150, the suture passing device 150 may include a snare, a hook latch splicing needle, and/or a shuttle. At least a portion of the first free end 138 and second free end 140 of the second suture or locking mechanism 134 extending through the first tail end 132 of the first suture longitudinally toward the first end 144. The first free end 138 and second free end 140 of the second suture or locking mechanism 134 extending outwardly from first tail end 132 of the first suture 130 extending outwardly from the outer surface of a sidewall of the first tail end 132 of the first suture 130 at a second location 152. The extending outwardly may be transverse or substantially transverse to the longitudinal axis of the first suture 130, a first tail end 132 of the first suture, and/or the splice region. The second location is disposed between the first end 144 and the second end 142.

Figure 5F:
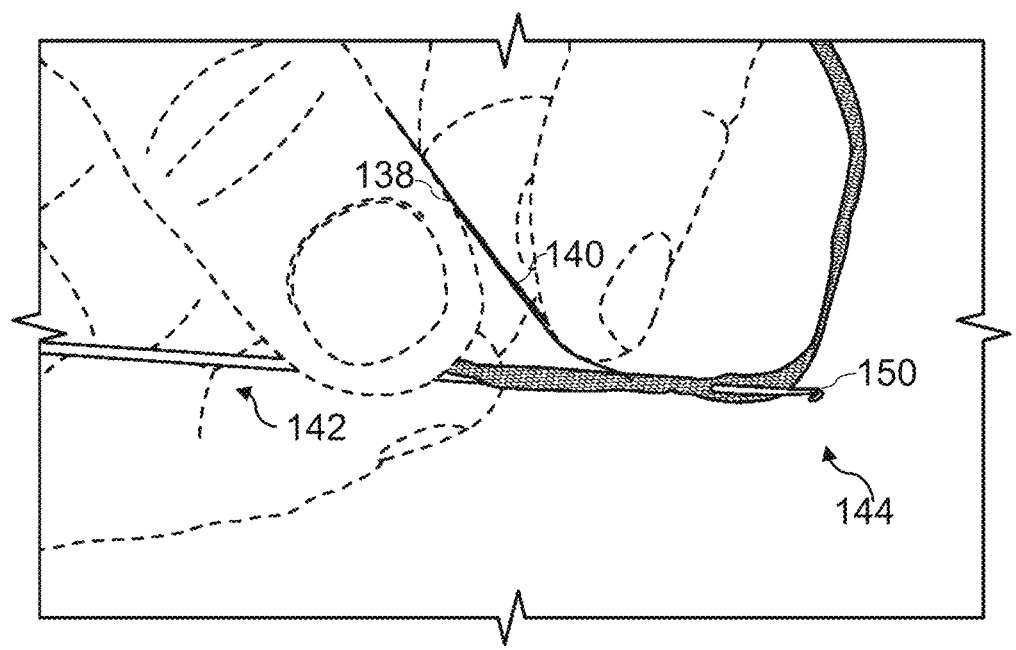
Figure 5G:
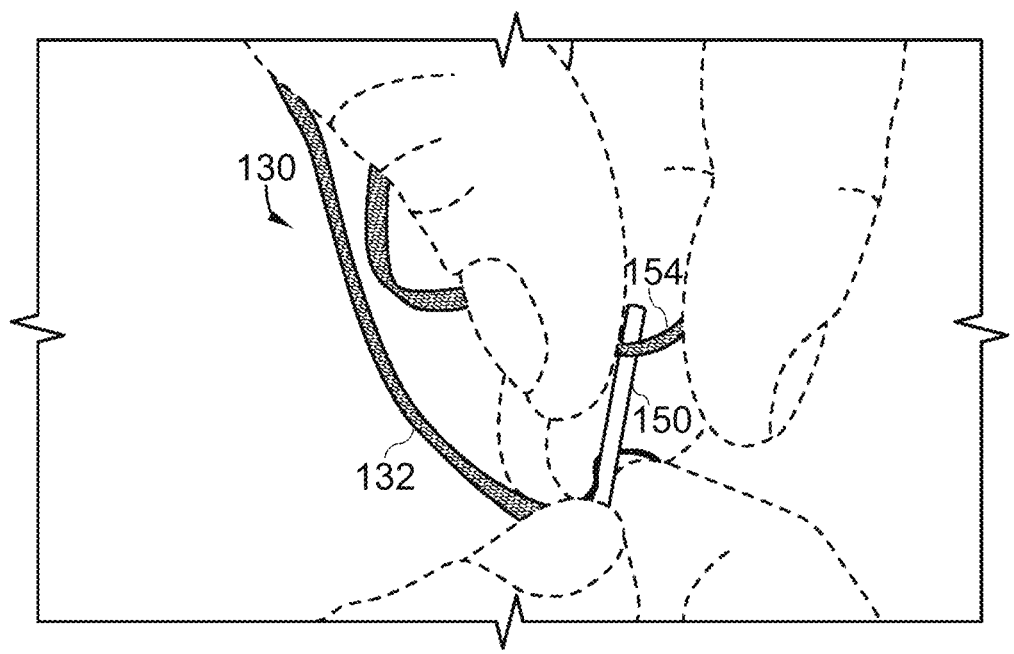
Figure 5H:
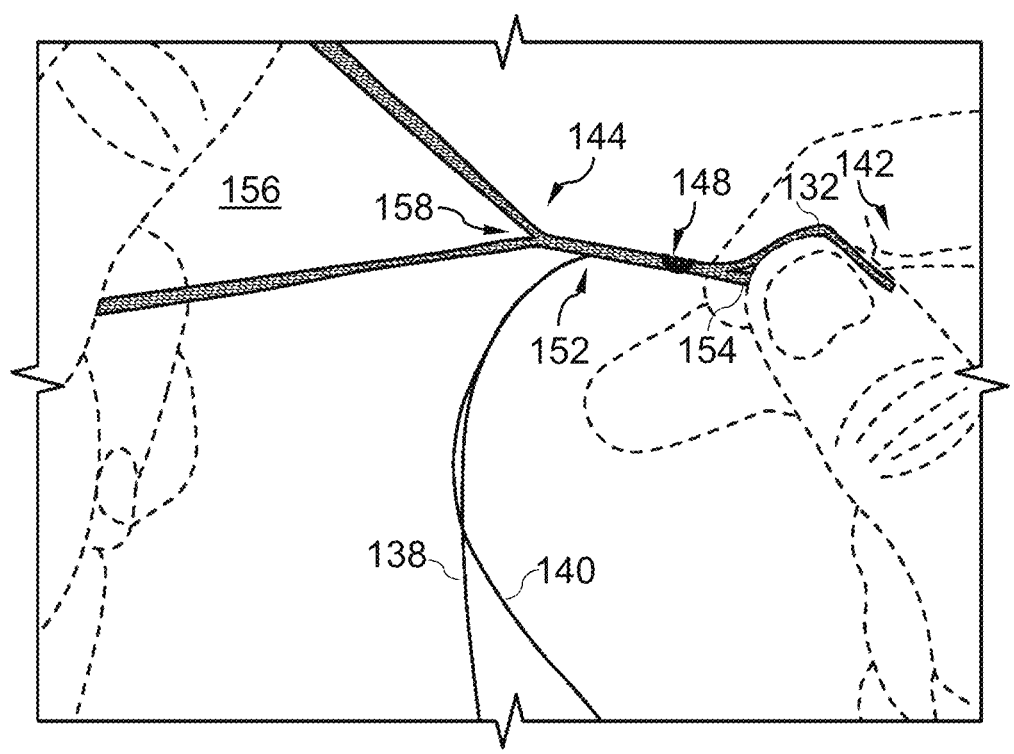

FIGS. 5F-5H illustrate the step of threading the second end of the first suture longitudinally through the first trail end of the first suture to create a splice region and a flexible loop 120. The threading, piercing and/or extending of the second tail end 154 of the first suture 130 into the first tail end 132 of the first suture 130 from a first end 144 towards the second end 142 to create a splice region and a flexible loop 156. The flexible loop 156 includes a loop crux 158. The threading, piercing and/or extending may be performed by using a suture passing device 150, the suture passing device 150 may include a snare, a hook latch splicing needle, and/or a shuttle. At least a portion of the second tail end 154 of the first suture 130 extends longitudinally and/or parallel to the first tail end 132 of the first suture 130. At least a portion of the second tail end 154 of the first suture 130 may extend beyond the first locked point 148 at the first location. The at least a portion of the second end 154 of the first suture 130 may be positioned proximate or near the first locked point 148 and/or the first location. The flexible loop 156 may be positioned proximate or near the second location 152 and/or third location and/or the first end 144.

The step of threading the second end of the first suture longitudinally through the first trail end of the first suture to create a splice region and a flexible loop 120 may further comprise the loading of an anchoring element (not shown). The anchoring element may comprise a flexible, textile anchoring element or a hard anchoring element. The anchoring element may comprise a button or a suture anchor.

Figure 5I:
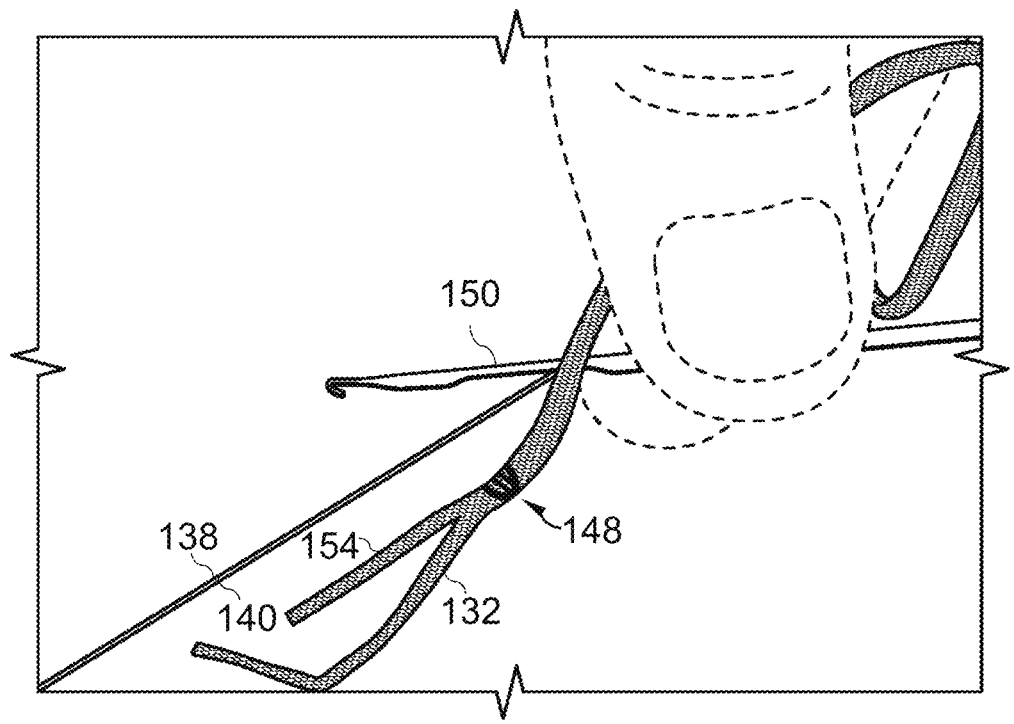
Figure 5J:
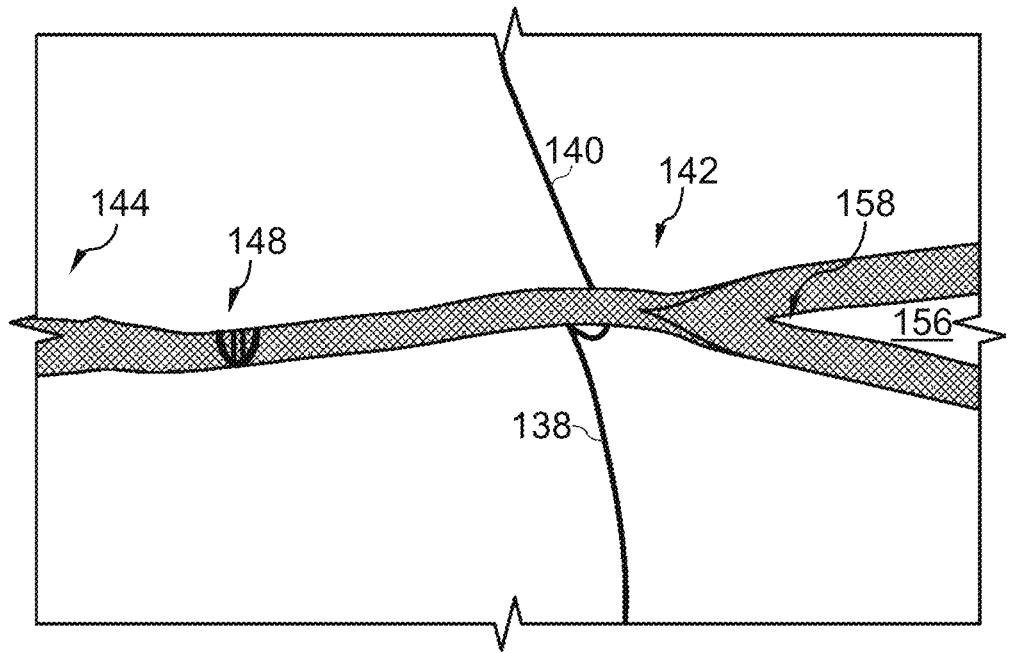

FIGS. 5I-5J illustrate the steps of piercing a first and second ends of the first suture with a first or second end of a second suture to extend outwardly at a third and/or fourth location 122. The piercing, extending and/or passing through may be accomplished by using a suture passer device 150, the suture passer device 150 may include a snare, a hook latch splicing needle, and/or a shuttle. At least a portion of the first free end 138 of the second suture or locking mechanism 134 and/or second free end 140 of the second suture piercing, passing or extending from a third location through the splice region transverse or substantially transverse to the longitudinal axis 146 of the first tail end 132 of the first suture 130 and/or the splice region. The first free end 138 of the second suture or locking mechanism 134 and/or second free end 140 of the second suture extending away from the outer surface or diameter of the splice region at the fourth location. The first free end 138 of the second suture or locking mechanism 134 and/or second free end 140 of the second suture are on opposing sides and/or opposing sides of the splice region. The second location is spaced apart from the third or fourth location. The second location is spaced apart at least 180 degrees from the third or fourth location. The third location and fourth location are disposed on opposite sides or opposing sides of the splice region. The third location and fourth location are near or adjacent to the first end 142.

Figure 5K:
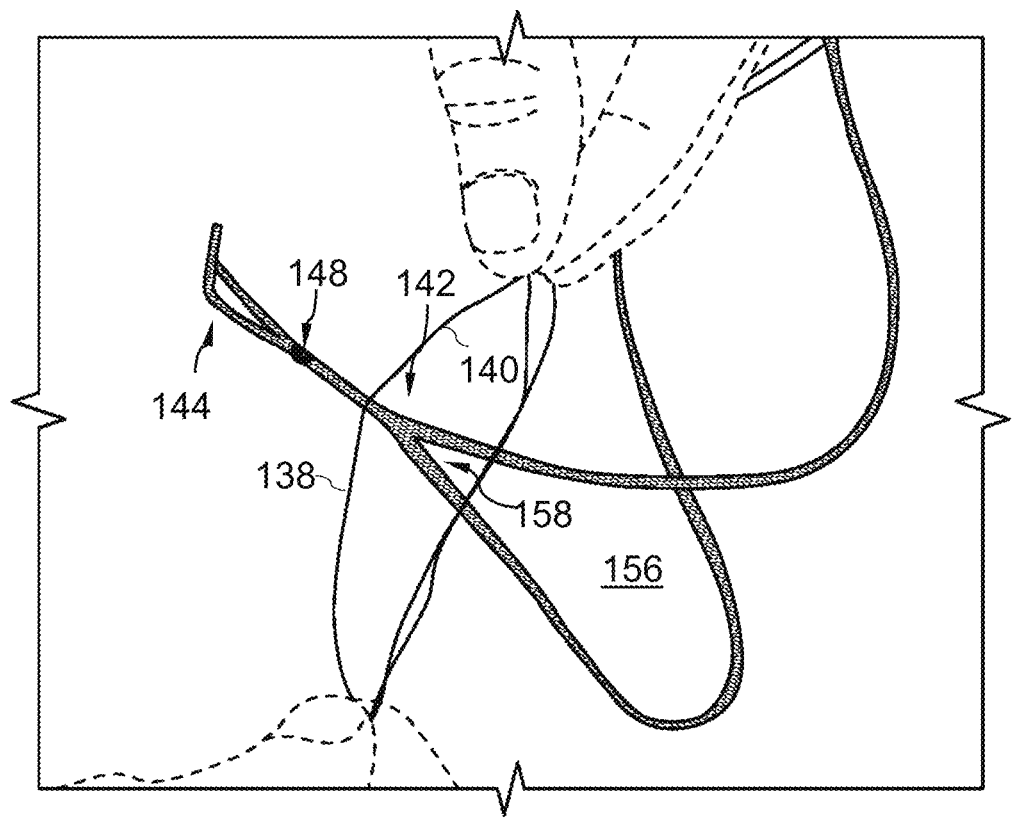

FIG. 5K illustrates the step of securing a portion of the first end and the second end of the second suture over the outer surface of the splice to create a second locked point 124. The step of securing 124 may further comprise extending the first free end 138 and the second free end 140 of the locking mechanism or second suture 134 outwardly in tension prior to coupling or securing. At least a portion of the first free end 138 and the second free end 140 of the locking mechanism or second suture 134 is coupled or secured together to create a second locked point 160. The second locked point 160 may comprise an adhesive, a slip knot, a friction knot and/or a hold knot. The hold knot may comprise a single over-hand knot or a double-overhand knot. The second locked point 160 is disposed over the outer surface or outer diameter of the splice region. The second locked point may be positioned near or adjacent to the second location, third and/or fourth location. The second locked point may be positioned near or adjacent to the first end 142.

Figure 5L:
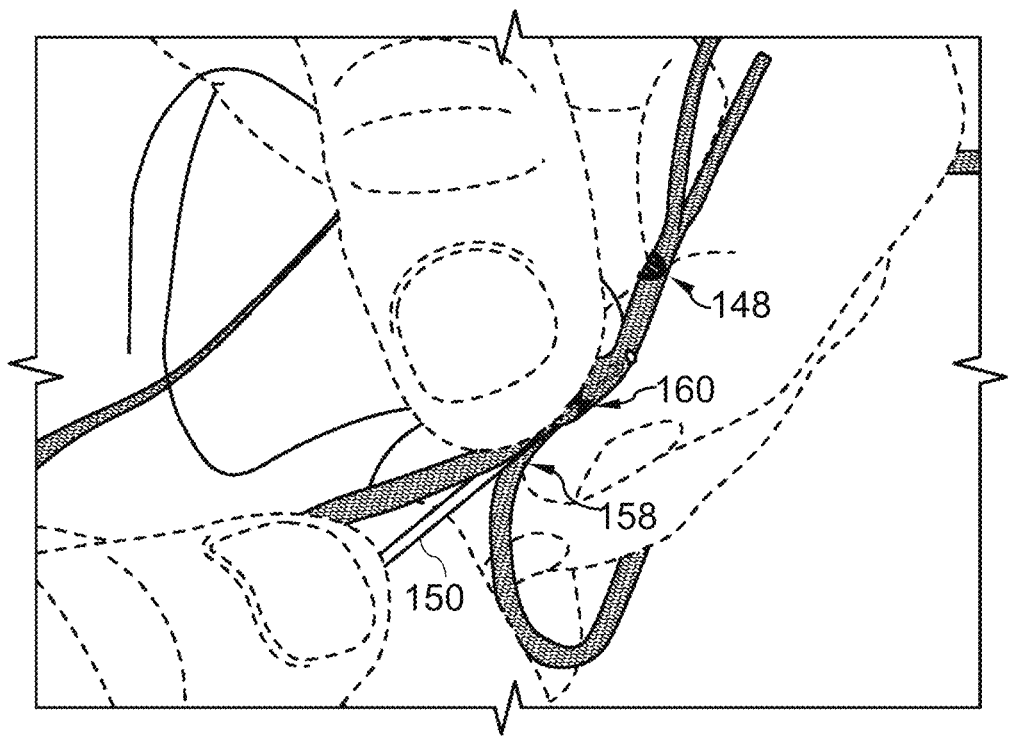
Figure 5M:
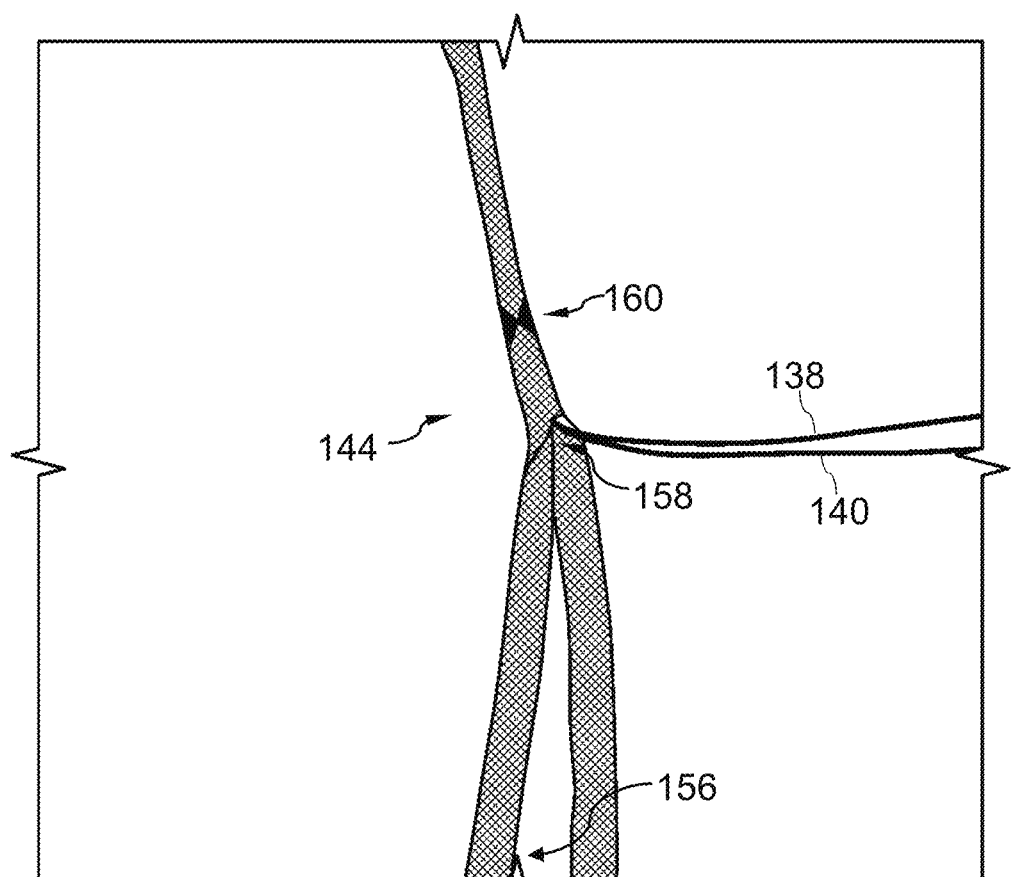
Figure 5N:
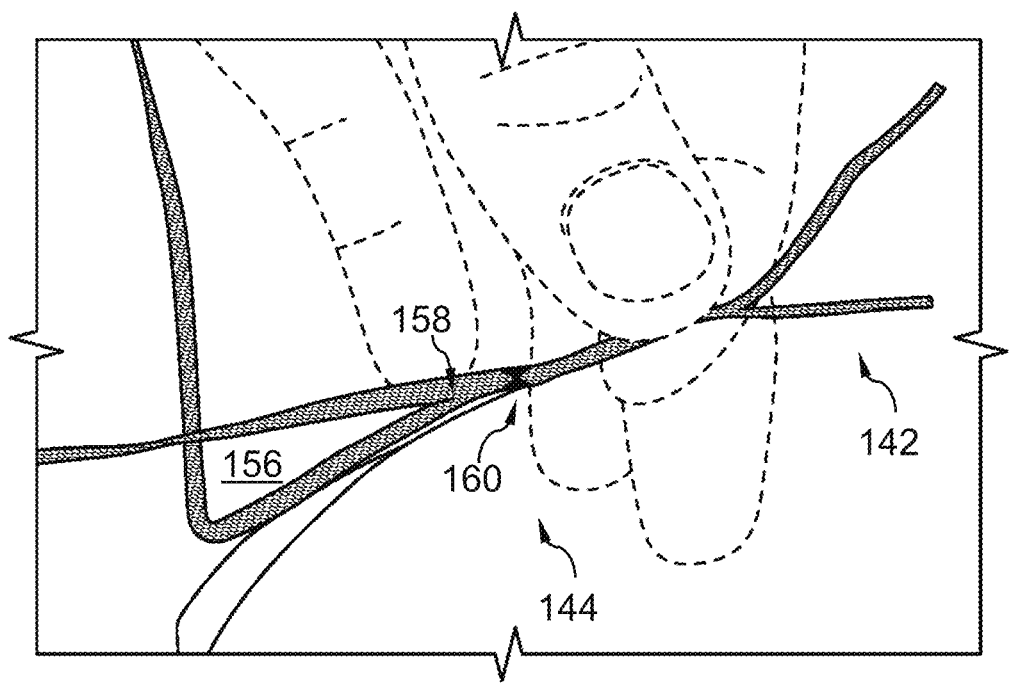

The step of securing 124 may further comprise the step of threading the first and/or second ends of the second suture through a portion of the splice region from a second, third and/or fourth location towards the loop crux of the flexible loop as shown in FIGS. 5L-5N. At least a portion of the first free end 138 and second free end 140 of the locking mechanism or second suture 134 pierces, extends or passes through the splice region longitudinal to the axis of the first tail end 132 or the splice region towards the first end 144 loop crux 158 of the flexible loop 156. The first free end 138 and second free end 140 of the locking mechanism or second suture 134 extend outwardly from the loop crux 158 of the flexible loop 156.

Figure 5O:
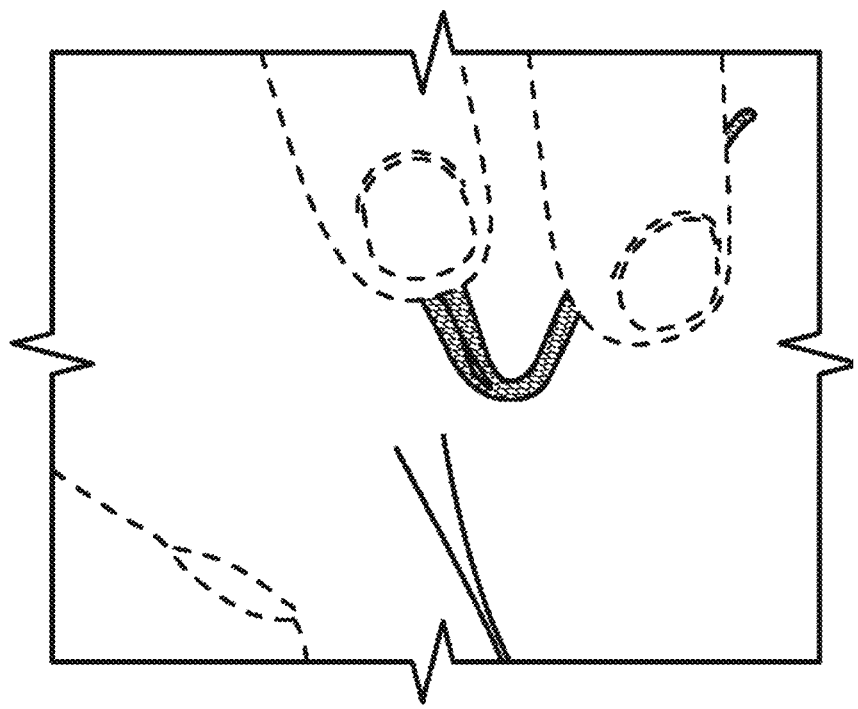
Figure 5P:
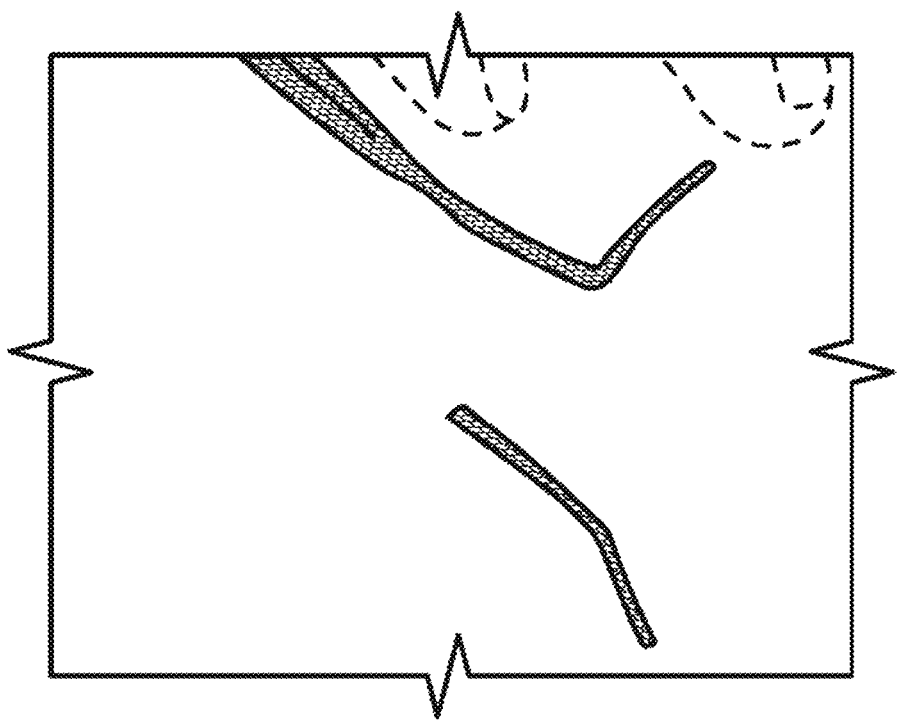

FIG. 5O-5P illustrate the step of trimming the first and second ends of the second suture and the second end of the first suture 126. The first free end 138 and/or second free end 140 of the second suture or locking mechanism 134 can be trimmed by any trimming device known in the art. The first trail end 132 and the second trail end 154 of the first suture 130 can be trimmed by any trimming device known in the art. Trimming can be done to ensure that the ends 132, 138, 140, 154 may be in close proximity to the outer surface of the splice region and/or the loop crux 158 of the flexible loop 158. Minimal extension of the ends 132, 138, 140, 154 may be visualized. Furthermore, the second end of the first suture may be trimmed to leave approximately greater than 5 mm in length.

Figure 5Q:
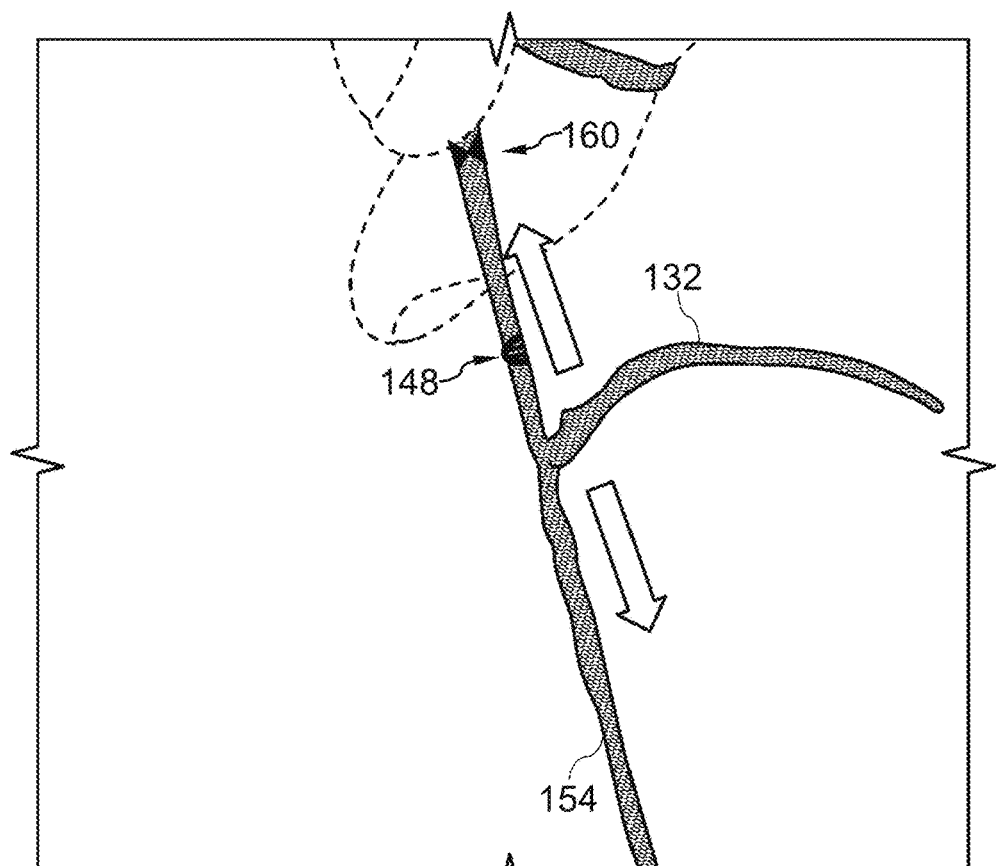
Figure 5R:
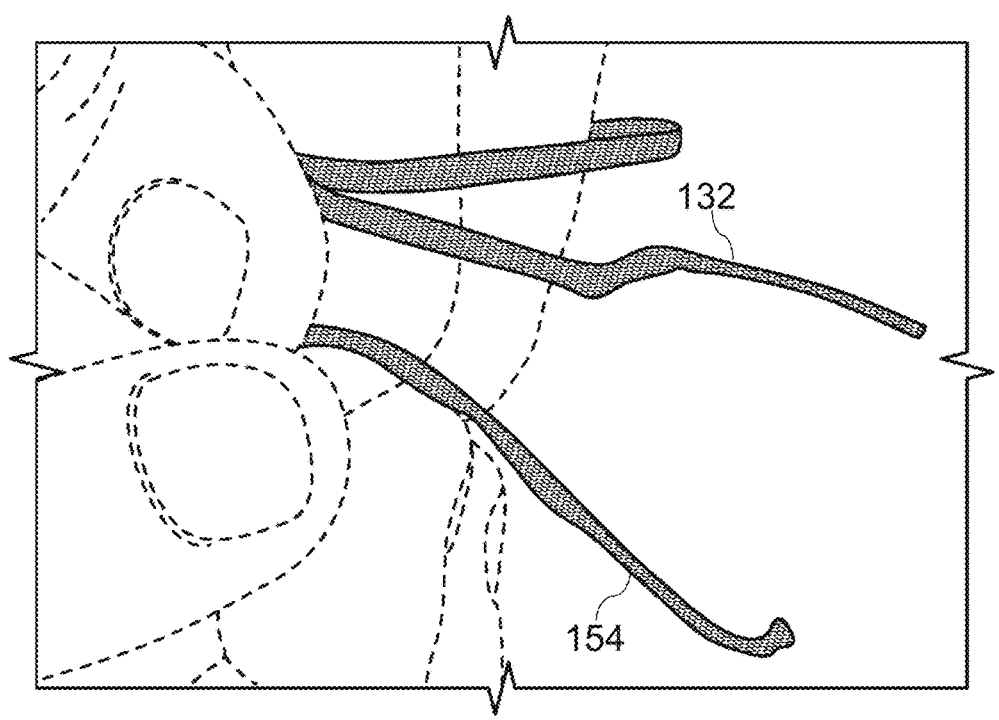

FIGS. 5Q-5R illustrate the step of accessing the first and second ends of the first suture 128. The accessing step 128 may comprise pulling tension of the first tail end 132 and the second tail end 154 in opposing directions to disengage the first locked point 148 and/or the second locked point 160. The tension created will disengage or dissemble the second 160 and first locked points 148 to be able to access the first and second ends of the first suture after implantation.

In the above embodiments, the spliced region or section comprising a first releasable locking point 148 and/or a second releasable locking point 160 which desirably allows the first suture 130 and its ends 132, 154 to be unified and to be opened at the surgeon's option without requiring severing or cutting. A light load or tension is applied to the first and second tail ends 132, 154 at a desired step in the surgery to separate the ends 132, 154 from each other and utilized separately by the surgeon.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., i.e., "such as") provided herein, is intended merely to better illuminate the invention and does not pose a limitation on the scope of the invention unless otherwise claimed. No language in the specification should be construed as indicating any non-claimed element as essential to the practice of the invention.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure. While embodiments and applications of the present subject matter have been shown and described, it should be apparent to those skilled in the art that many more modifications are possible without departing from the inventive concepts herein. The subject matter, therefore, is not to be restricted except in the spirit of the appended claims. Thus, while embodiments and applications of the present subject matter have been shown and described, it should be apparent that other embodiments, applications and aspects are possible and are thus contemplated and are within the scope of this application.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method of assembling a breakaway suture anchor construct comprises the steps of:
   providing a first suture and a second suture, the first suture comprising a longitudinal axis, a first end and a second end, and the second suture comprising a first end and a second end;
   extending a portion the second suture through a portion of the first end of the first suture transverse to the longitudinal axis at a first location to create a trailing loop;
   creating a first locked point at the first location by passing the first and second free ends of the second suture through the trailing loop of the second suture;
   forming a spliced region and a flexible suture loop by threading the second end of the first suture longitudinally through the first end of the first suture, the spliced region includes a spliced first end and a spliced second end, the flexible suture loop comprises a loop crux; and creating a second releasable locked point at a second location, the second releasable locked point prevents the first end of the first suture to move relative to the second end of the first suture.

2. The method claim 1, wherein the method of assembling a breakaway suture construct further comprises the step of: tucking the first end and the second end of the second suture through the splice region from the second location towards the spliced first end of the spliced region to exit out the loop crux of the flexible loop.

3. The method of claim 2, wherein the method of assembling a breakaway suture construct further comprises the step of: trimming the first and second ends of the second suture and the second end of the first suture.

4. The method of claim 1, wherein the method of assembling a breakaway suture construct further comprises the step of: accessing the first and second ends of the first suture by separating the first or second releasable locked points.

5. The method of claim 1, wherein the method of assembling a breakaway suture construct further comprises the step of: loading an anchoring element onto the first suture.

6. The method of claim 5, wherein the anchoring element comprises a flexible anchoring element or a hard anchoring element.

7. The method of claim 6, wherein the anchoring element comprises the flexible anchoring element, wherein the flexible anchoring element is a textile suture anchor.

8. The method of claim 6, wherein the anchoring element comprises the hard anchoring element, wherein the hard anchoring element is a button.

9. The method of claim 1, wherein the first location is adjacent to the spliced second end of the spliced region and the second location is adjacent to the spliced first end of the spliced region.

10. The method of claim 1, wherein the step of creating a second releasable locked point at a second location further comprises the step of piercing a first outer wall of the spliced region and a second outer wall of the spliced region, the spliced region comprises the first and second ends of the first suture.

11. The method of claim 1, wherein the first releasable locking point comprises a lanyard hitch-knot or a cow hitch-knot, and the second releasable locking point comprises a double-over hand knot.

12. The method of claim 11, wherein the double-over hand knot contacts the outer surface of the spliced region at the second location.

13. The method of claim 1, wherein the second suture is a single, continuous suture.

14. The method of claim 1, wherein the first suture comprises a first width and the second suture comprises a second width, the first width of the first suture is larger than the second width of the second suture.

15. The method of claim 1, wherein the first suture comprises a flat-to-round suture, a round suture or a flat suture.

16. The method of claim 1, wherein the second suture comprises a round suture.

17. The method of claim 1, wherein the first suture comprises a flat-to-round suture and the round portion of the flat-to-round suture is disposed within the spliced region.

* * * * *